United States Patent
Parks

(10) Patent No.: US 7,995,129 B2
(45) Date of Patent: Aug. 9, 2011

(54) IMAGE SENSOR FOR STILL OR VIDEO PHOTOGRAPHY

(75) Inventor: Christopher Parks, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 12/612,950

(22) Filed: Nov. 5, 2009

(65) Prior Publication Data

US 2010/0045840 A1  Feb. 25, 2010

Related U.S. Application Data

(62) Division of application No. 11/386,929, filed on Mar. 22, 2006, now Pat. No. 7,636,119.

(60) Provisional application No. 60/752,307, filed on Dec. 21, 2005.

(51) Int. Cl.
H04N 3/14 (2006.01)

(52) U.S. Cl. .......................... 348/321; 348/294

(58) Field of Classification Search .......... 348/294–324; 257/290–292; 250/208.1
See application file for complete search history.

(56) References Cited

U.S. PATENT DOCUMENTS

| | | | |
|---|---|---|---|
| 4,559,550 A | 12/1985 | Koike et al. | |
| 4,750,042 A * | 6/1988 | Murayama et al. | 348/323 |
| 4,821,088 A * | 4/1989 | Tabei et al. | 348/280 |
| 5,379,125 A * | 1/1995 | Iizuka | 358/443 |
| 5,555,023 A | 9/1996 | Maenaka et al. | |
| 5,668,597 A | 9/1997 | Parulski et al. | |
| 5,828,406 A | 10/1998 | Parulski et al. | |
| 5,847,758 A | 12/1998 | Iizuka | |
| 5,926,215 A * | 7/1999 | Whipple et al. | 348/280 |
| 6,169,577 B1 | 1/2001 | Iizuka | |
| 6,342,921 B1 | 1/2002 | Yamaguchi et al. | |
| 6,462,779 B1 | 10/2002 | Philbrick | |
| 6,661,451 B1 | 12/2003 | Kijima et al. | |
| 7,292,274 B2 | 11/2007 | Nakamura | |
| 2001/0010554 A1 | 8/2001 | Yoshida | |
| 2002/0135689 A1 | 9/2002 | Uya | |
| 2003/0067550 A1 | 4/2003 | Inokuma et al. | |
| 2004/0150733 A1 | 8/2004 | Nagayoshi et al. | |
| 2005/0062868 A1* | 3/2005 | Shiiba et al. | 348/316 |
| 2005/0243195 A1 | 11/2005 | Parks et al. | |
| 2005/0259171 A1 | 11/2005 | Nishi | |

FOREIGN PATENT DOCUMENTS

| | | |
|---|---|---|
| EP | 0 840 503 | 5/1998 |
| EP | 0 936 806 | 8/1999 |
| EP | 0 939 544 | 9/1999 |
| JP | 2003-324655 | 11/2003 |

* cited by examiner

*Primary Examiner* — David L Ometz
*Assistant Examiner* — Ahmed Berhan
(74) *Attorney, Agent, or Firm* — Nancy R. Simon

(57) ABSTRACT

An image sensor includes a plurality of vertical CCDs; first HCCD receiving charge packets from even numbered vertical CCDs; and a second HCCD receiving charge packets from odd numbered vertical CCDs; wherein four charge packets are summed together from the first HCCD, and four charge packets are summed together in the second HCCD such that the summing process in the second HCCD begins one or two charge packets spatially after the first charge packet of the four charge packets summed in the first HCCD.

1 Claim, 37 Drawing Sheets

| RED | GREEN |
|---|---|
| GREEN | BLUE |

BAYER PATTERN

| A | C |
|---|---|
| B | D |

GENERAL 2X2 PATTERN

FIG. 2
*(PRIOR ART)*

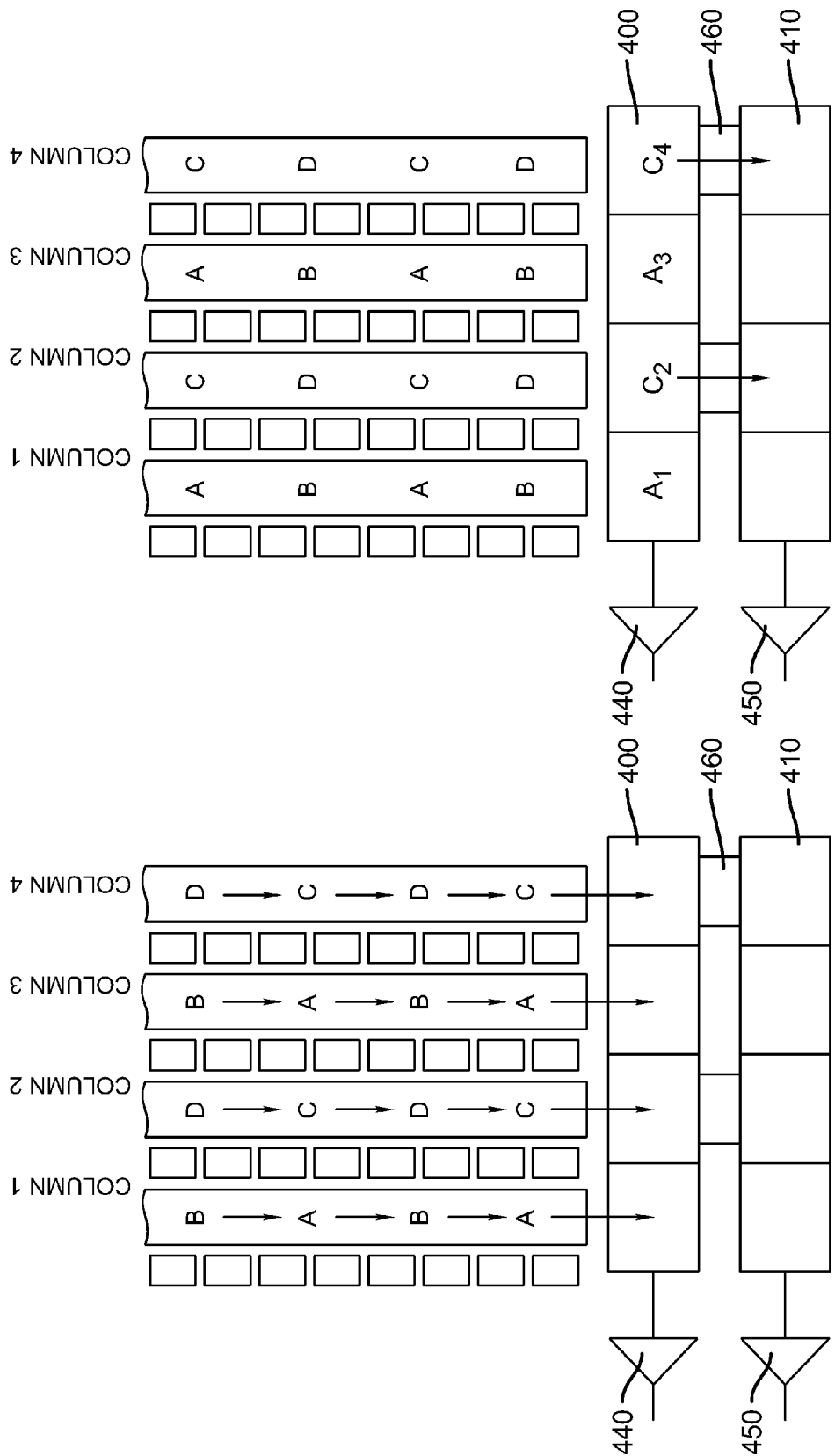

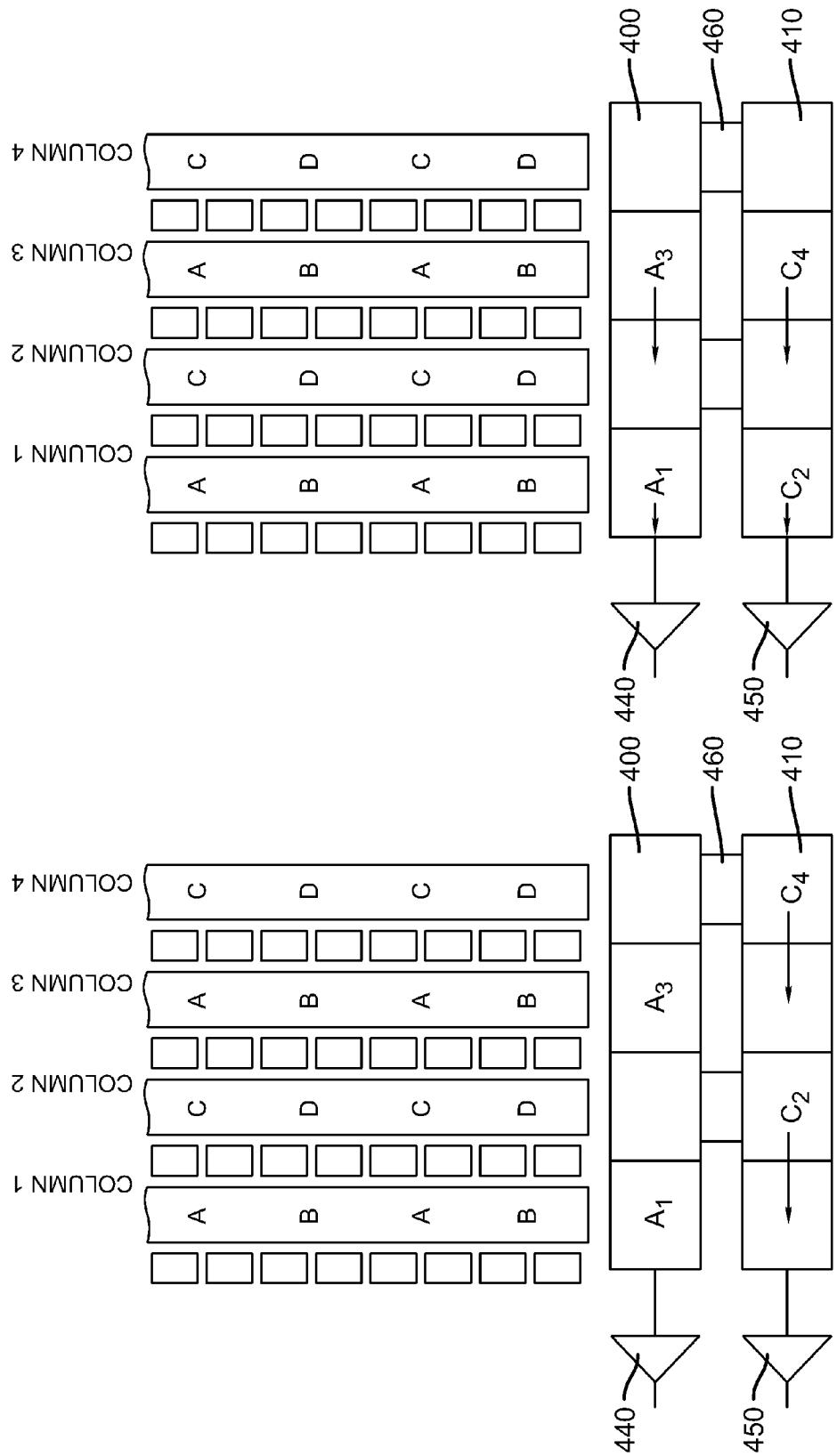

IMAGE SENSOR FOR STILL OR VIDEO PHOTOGRAPHY

CROSS REFERENCE TO RELATED APPLICATIONS

This is a Divisional of application Ser. No. 11/386,929 filed Mar. 22, 2006, now U.S. Pat. No. 7,636,119 which is the 111A application of Provisional Application Ser. No. 60/752,307, filed Dec. 21, 2005.

FIELD OF THE INVENTION

The invention relates generally to the field of image sensors and, more particularly, to producing at least 30 frames per second (video) by sampling the entire array of the image sensor and summing all pixel values in a predetermined manner.

BACKGROUND OF THE INVENTION

Referring to FIG. 1, an interline charge coupled device (CCD) image sensor 10 is comprised of an array of photodiodes 20. The photodiodes are covered by color filters to allow only a narrow band of light wavelengths to generate charge in the photodiodes. Referring to FIG. 2, typically image sensors have a pattern of three or more different color filters arranged over the photodiodes in a 2×2 sub array as shown in FIG. 2. For the purpose of a generalized discussion, the 2×2 array is assumed to have four colors, A, B, C, and D. The most common color filter pattern used in digital cameras is the Bayer pattern, in which color A is red, color B and C are green, and color D is blue.

Referring back to FIG. 1, image readout of the photo-generated charge begins with the transfer of some or all of the photodiode charge to the vertical CCD (VCCD) 30. In the case of a progressive scan CCD, every photodiode simultaneously transfers charge to the VCCD 30. In the case of a two field interlaced CCD, first the even numbered photodiode rows transfer charge to the VCCD 30 for first field image readout, then the odd numbered photodiode rows transfer charge to the VCCD 30 for second field image readout. Interlaced CCDs are not limited to two-field read out. Four or more interlaced fields are also commonly used.

Charge in the VCCD 30 is read out by transferring all columns in parallel one row at a time into the horizontal CCD (HCCD) 40. The HCCD 40 then serially transfers charge to an output amplifier 50.

FIG. 1 shows an array of only 24 pixels. Many digital cameras for still photography employ image sensors having millions of pixels. A 10-megapixel image sensor would require at least ⅓ second to read out at a 40 MHz data rate. This is not suitable if the same camera is to be used for recording video. A video recorder requires an image read out in ⅟30 second. The shortcoming to be addressed by the present invention is how to use an image sensor with more than 1 million pixels as both a high quality digital still camera and 30 frames/second video camera.

The prior art addresses this problem by providing a video image at a reduced resolution (typically 640×480 pixels). For example, an image sensor with 3200×2400 pixels would be have only every fifth pixel read out as described in U.S. Pat. No. 6,342,921. This is often referred to as sub-sampling, or sometimes as thinned out mode or skipping mode. The disadvantage of sub-sampling the image by a factor of 5 is only 4% of the photodiodes are used. A sub-sampled image suffers from reduced photosensitivity and alias artifacts. If a sharp line focused on the image sensor is only on the un-sampled pixels, the line will not be reproduced in the video image. Other sub-sampling schemes are described in U.S. Pat. Nos. 5,668,597 and 5,828,406.

The prior art, including U.S. Pat. No. 6,661,451 or US Patent Application Publication 2002/0135689A1, attempts to resolve the problems of sub-sampling by summing pixels together. However, this prior art still leaves some pixels un-sampled.

US Patent Application Publication 2001/0010554A1 increases the frame rate by summing pixels together without sub-sampling. However, it requires a two field interlaced read out. It is more desirable to obtain a video image with progressive scan read out. Interlaced video acquires the two fields at different times. A moving object in the image will appear in different locations when each interlaced field is acquired.

Another disadvantage of the prior art is it only reduces the image resolution in the vertical direction. In the horizontal direction, the HCCD must still read out every pixel. Only reducing the image resolution through sub-sampling or other methods in the vertical direction does not increase the frame rate to 30 frames/second for very large (greater than 8 million pixels) image sensors.

US Patent Application Publication 2003/0067550A1 reduces the image resolution vertically and horizontally for even faster image readout. However, this prior art requires a striped color filter pattern (a 3×1 color filter array), which is generally acknowledged to be inferior to the Bayer or 2×2 color filter array patterns.

US Patent Application Publication 2004/0150733A1 addresses the disadvantages of sub-sampling by summing together groups of pixels in sub-arrays 2n+1 pixels square, where n is an integer. This only provides a means of summing pixel sub-arrays of an odd number of pixels. It also does not disclose the use of multiple horizontal CCDs for faster image read out at full resolution. The present invention discloses a means of summing together even numbered groups of pixels with multiple horizontal CCDs.

US Patent Application Publication 2005/0259171A1 provides a means of summing pixel sub-arrays with multiple horizontal CCDs. However, the horizontal CCD architecture does not provide a means of shifting charge packets in one horizontal CCD independently from a second horizontal CCD to provide proper summing of pixels such that the summed pixel pattern closely matches the Bayer color filter pattern. This deficiency arises from using only two horizontal CCD control gates that are common to all horizontal CCD registers. US Patent Application Publication 2005/0259171A1 also does not provide a means of reducing the total number of horizontal CCD clock cycles by a factor of two when summing pixel sub-arrays. That decreases the frame rate by a factor of two compared to the present invention.

In view of the deficiencies of the prior art, an invention is desired which is able to produce 30 frames/second video from a megapixel image sensor with a 2×2 color filter pattern while sampling 100% of the pixel array and reading out the video image progressive scan (non-interlaced) and also producing a new summed pixel array that closely matches the Bayer color filter pattern to enable use of standard Bayer color filter pattern interpolation and video compression hardware.

SUMMARY OF THE INVENTION

The present invention is directed to overcoming one or more of the problems set forth above. Briefly summarized, according to one aspect of the present invention, an image sensor comprises: (a) a plurality of vertical charge-coupled devices; (b) a first horizontal charge-coupled device receiving charge packets from even numbered vertical charge-coupled devices; and (c) a second horizontal charge-coupled device receiving charge packets from odd numbered vertical charge-coupled devices; wherein four charge packets are summed together from the first horizontal charge-coupled device, and four charge packets are summed together in the second horizontal charge-coupled device such that the summing process in the second horizontal charge-coupled device begins one or two charge packets spatially after the first charge packet of the four charge packet summed in the first horizontal charge-coupled device.

The above and other objects of the present invention will become more apparent when taken in conjunction with the following description and drawings wherein identical reference numerals have been used, where possible, to designate identical elements that are common to the figures.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention includes the advantage of producing 30 frames per second for video while sampling the entire pixel array.

BRIEF DESCRIPTION OF THE DRAWINGS

FIG. 2 is a typical color filter array for image sensors;
FIGS. 15a-15d show the flow of charge for reading out a full resolution image.

DETAILED DESCRIPTION OF THE INVENTION

Figure 3B:
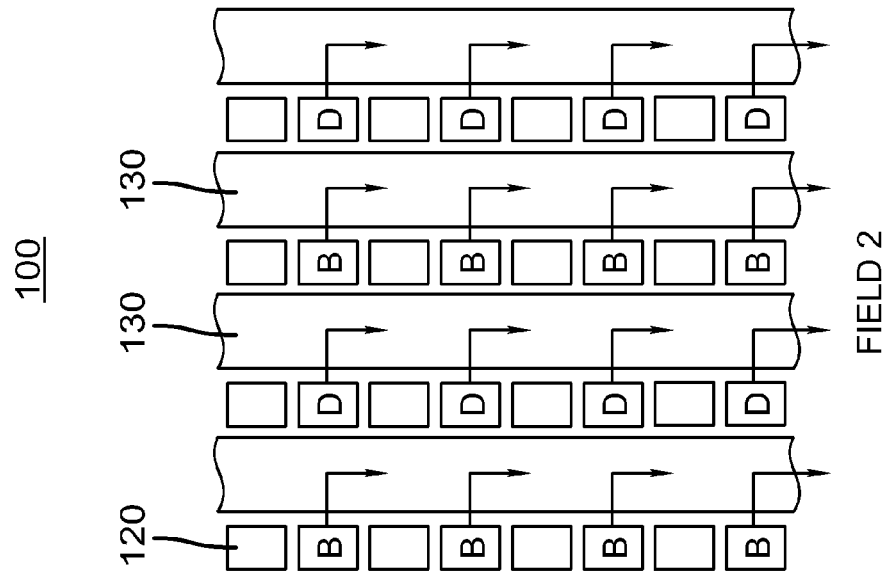
FIGS. 3a and 3b are diagrams illustrating flow of charge in image sensors of the present invention for full resolution read out.
Figure 3A:
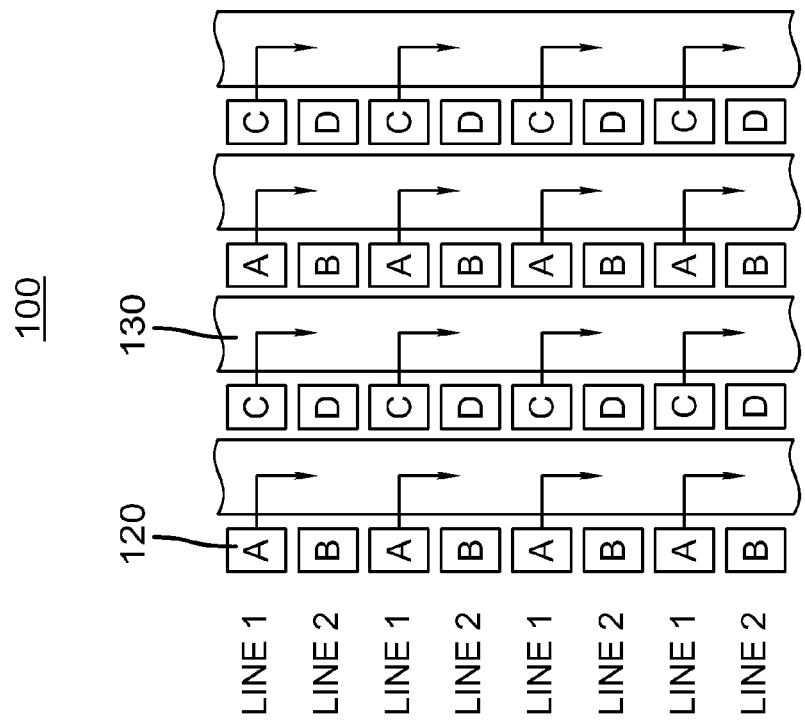

Referring to FIGS. 3a and 3b, there is shown the image sensor 100 of the present invention. For clarity, only a small portion of the pixel array of the image sensor 100 is shown. It consists of an array of photodiodes 120 with VCCDs 130 positioned in between columns of photodiodes 120. There are color filters repeated in a 2×2 array spanning across the entire photodiode array. The 4 color filters A, B, C, and D are of 3 or 4 unique colors. The colors typically are, but not limited to, A=red, B=C=green, D=blue. Other common color schemes utilize cyan, magenta, and yellow or even white filters.

Figure 4:
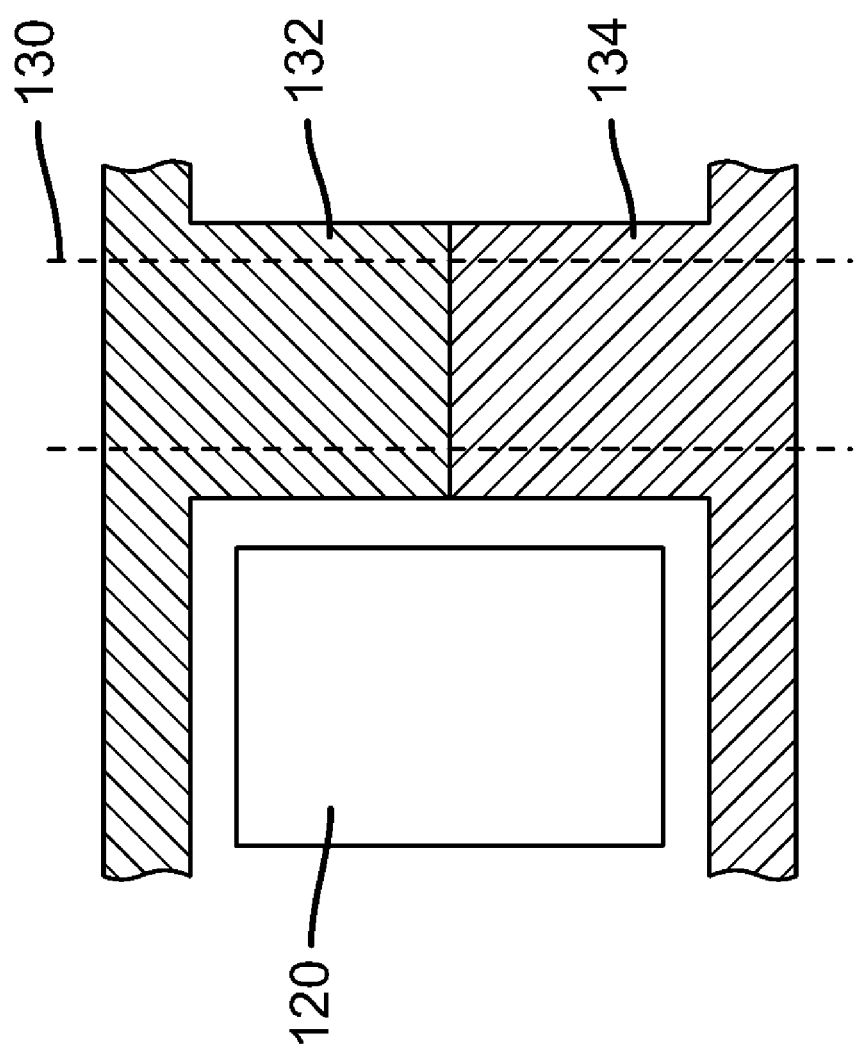
FIG. 4 is a detailed view of a pixel including the VCCD.

Referring briefly to FIG. 4, one pixel is shown. The VCCD 130 is of the interlaced 4-phase type with two control gate electrodes 132 and 134 per photodiode 120.

Referring back to FIG. 3a, the full resolution read out of an image stored in the photodiodes 120 proceeds in the below-described manner for an interlaced image sensor 100. First the charge in field 1, consisting of all lines labeled as line 1, is transferred from the photodiodes 120 to the adjacent VCCD 130. The VCCD 130 will only receive charge from lines containing colors A and C. Once charge is in the VCCD 130, it is transferred in parallel towards a serial HCCD (not shown) and then towards and output amplifier (not shown), as is well known in the art. Next in FIG. 3b, after all signals from colors A and C have been transferred out of the VCCD 130, the remaining charge in the photodiodes 120 in line 2 is transferred into the VCCD 130. This is field 2 containing only colors B and D. Since the image is read out in two fields, an external shutter is used to block light and prevent further accumulation of signal in the second field while the first field is being read out. A similar readout sequence would take place if the image sensor were divided up into more than 2 interlaced fields.

When the sensor is installed in a digital camera and is to be used in video mode, the external shutter is held open and the image sensor 100 is operated continuously. Most applications define video as a frame rate of at least 10 frames/sec with 30 frames/sec being the most desired rate. Currently, image sensors are typically of such high resolution that full resolution image readout at 30 frames/sec is not possible at data rates less than 50 MHz and one or two output amplifiers. The solution of the present invention is to sum together pixels inside the image sensor to reduce the number of pixels down to a resolution allowing video rate imaging.

Figure 5:
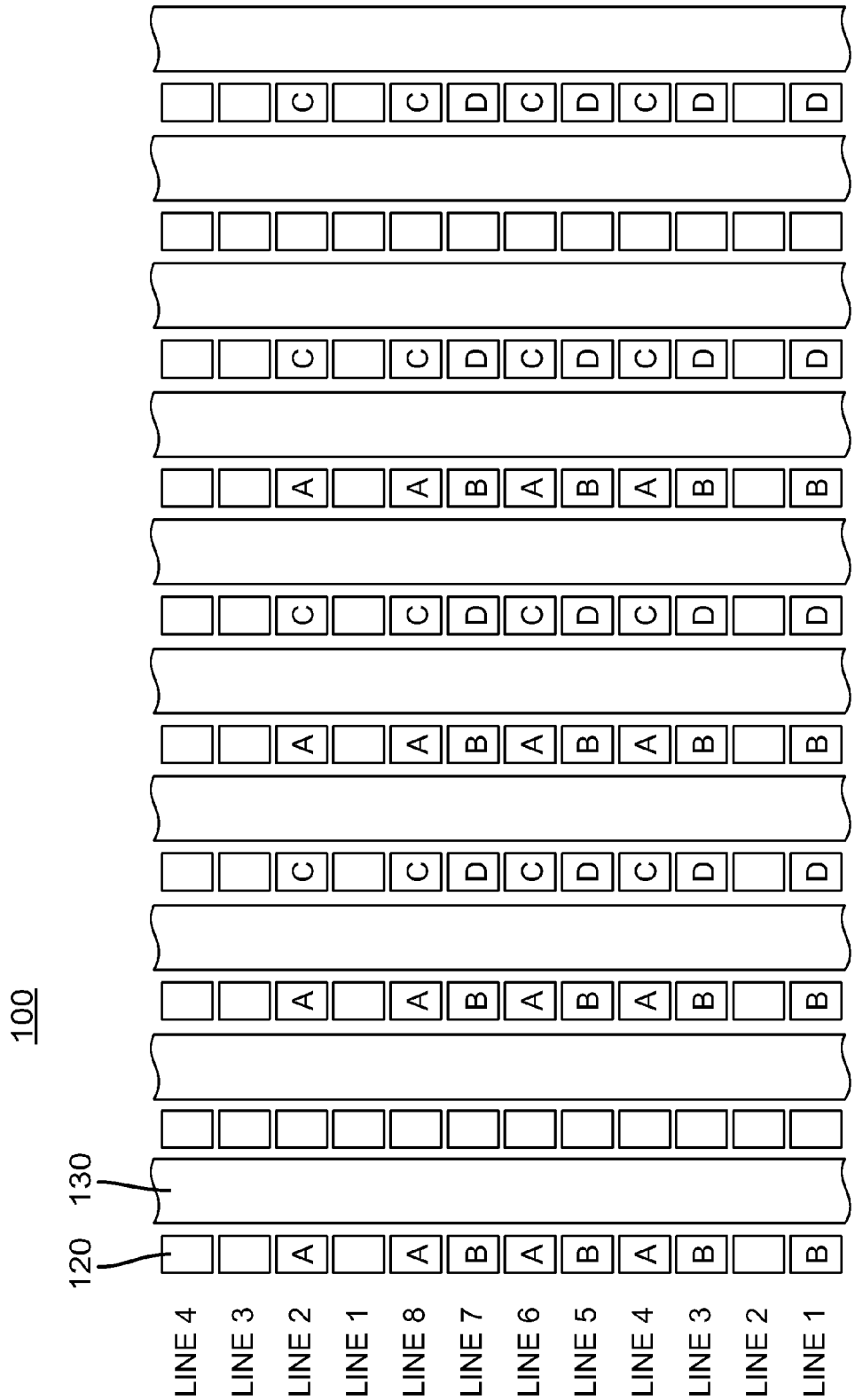
FIG. 5 is a diagram showing 4×4 pixel sub-arrays of 4 colors that are summed together.

The preferred embodiment of the invention is to sum a 4×4 pixel sub-array inside the CCD shift registers to form a charge packet representing the sum of 16 pixels of one color. FIG. 5 shows a portion of the image sensor pixel array 100. Only those photodiodes 120 that are to be summed together are labeled with a color A, B, C, or D. That summing arrangement is repeated across the entire image sensor pixel array to eventually include every pixel in the image sensor.

Figure 6:
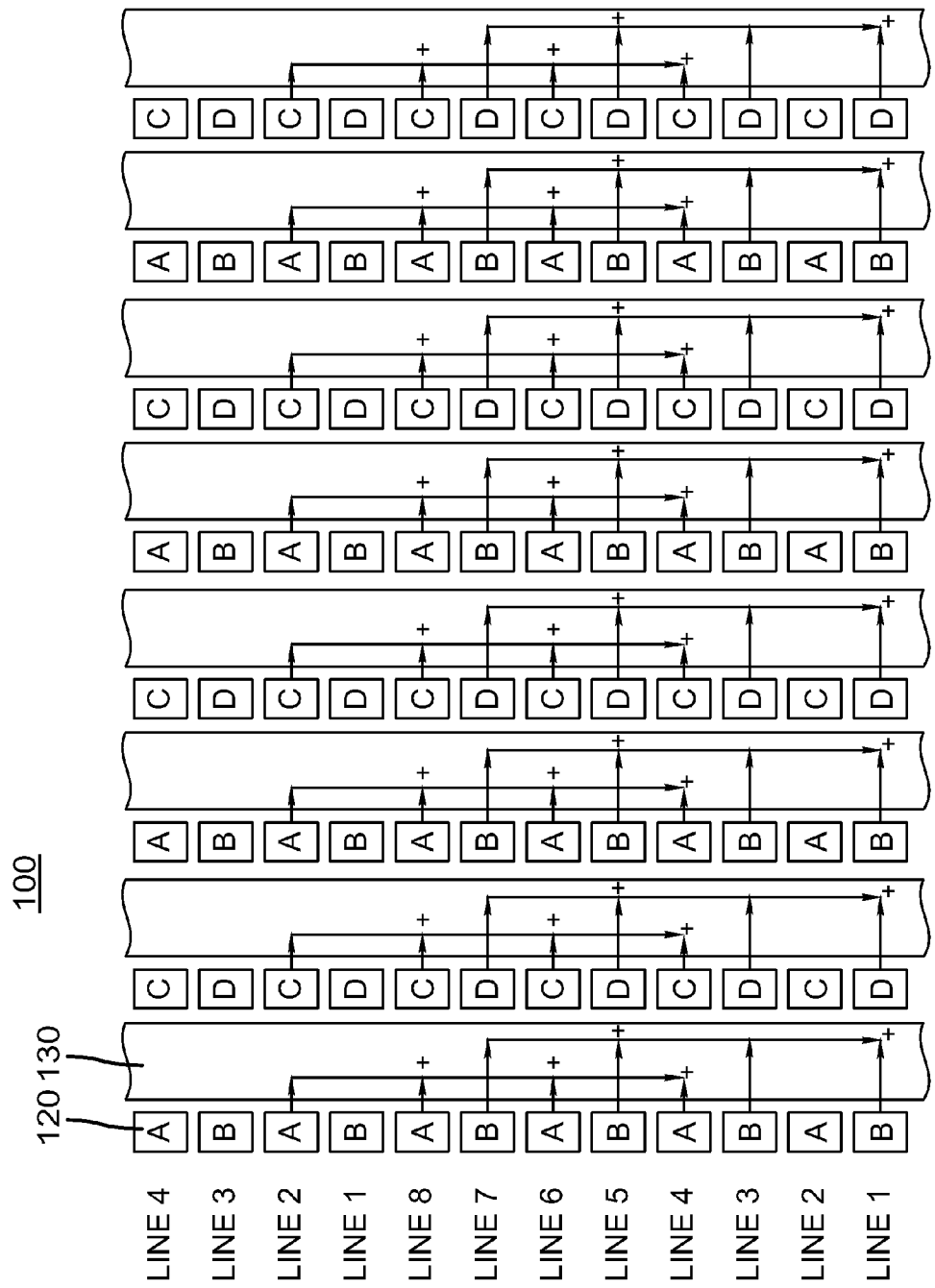
FIG. 6 shows the process of summing 4 rows of charge.
Figure 7:
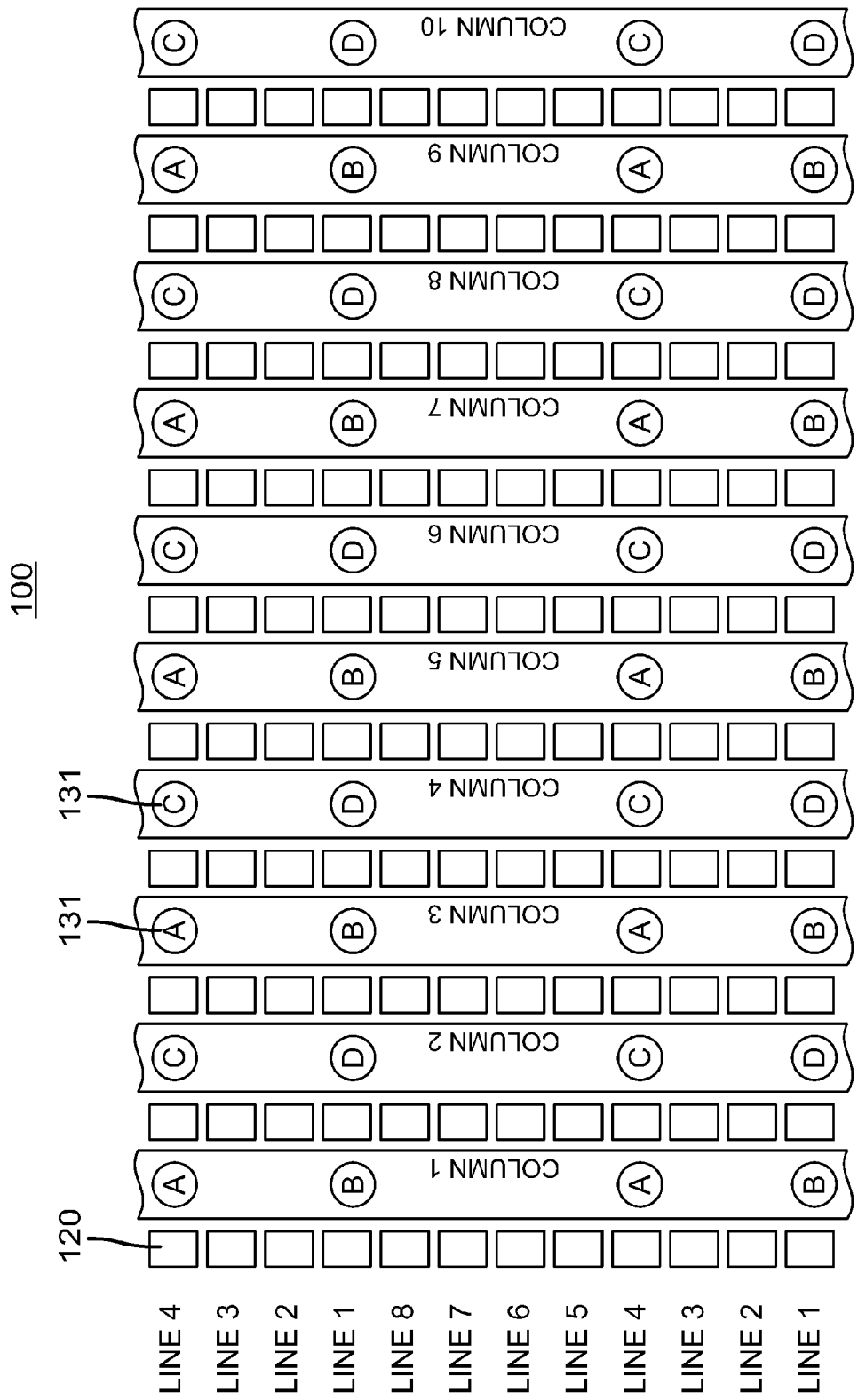
FIG. 7 is a view of FIG. 6 after the 4 row summing process is completed.

The first step of the summing process is shown in FIG. 6. Four lines of charge of one color are summed together. FIG. 6 shows a repeating set of 8 lines of the image sensor 100. First photodiode 120 charges are transferred to the VCCD 130 on lines 2 and 7. This is done without mixing charge packets of different colors. Then those two lines are shifted down until they align with lines 8 and 5 respectively. Next photodiode 120 charges are transferred from lines 8 and 5 and summed with the same colors that originated from lines 2 and 7. Next the summed charge packets are transferred down another two lines to align with lines 6 and 3 and charge packets are summed into the VCCD 130 from lines 6 and 3. Next the summed charge packets are transferred down another two lines to align with lines 4 and 1 and charge packets are summed into the VCCD 130 from lines 4 and 1. Now the VCCD 130 contains charge packets of two colors per column 131 comprised of the sum of four lines of photodiode 120 charge as depicted in FIG. 7.

Figure 8:
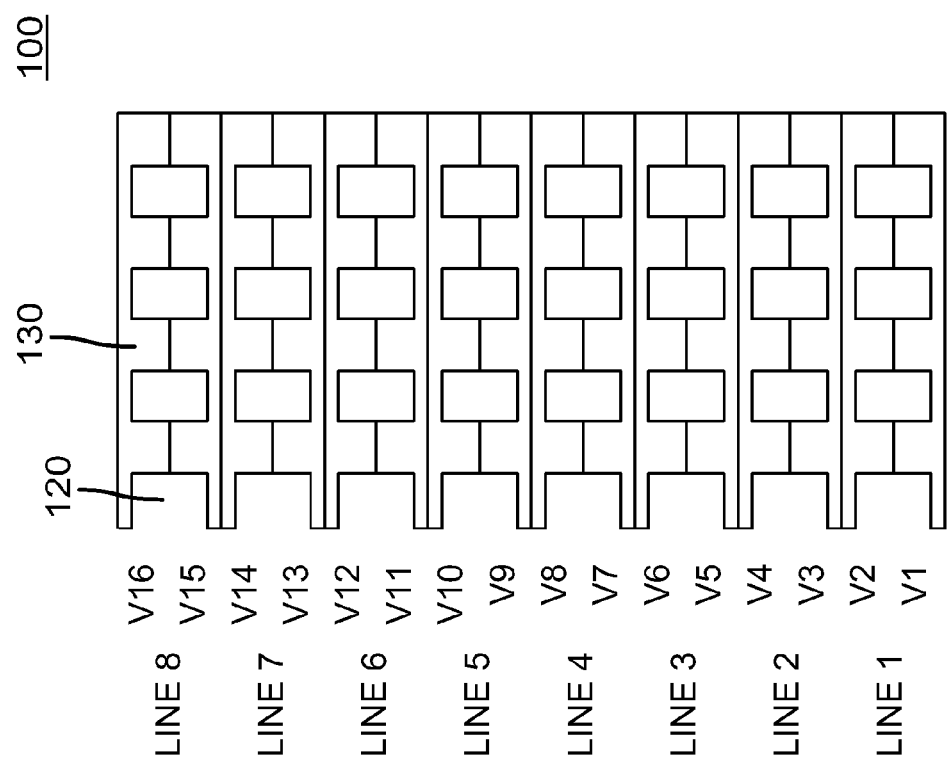
FIG. 8 is a detail view of the 8 line repeating VCCD gate structure.
Figure 9:
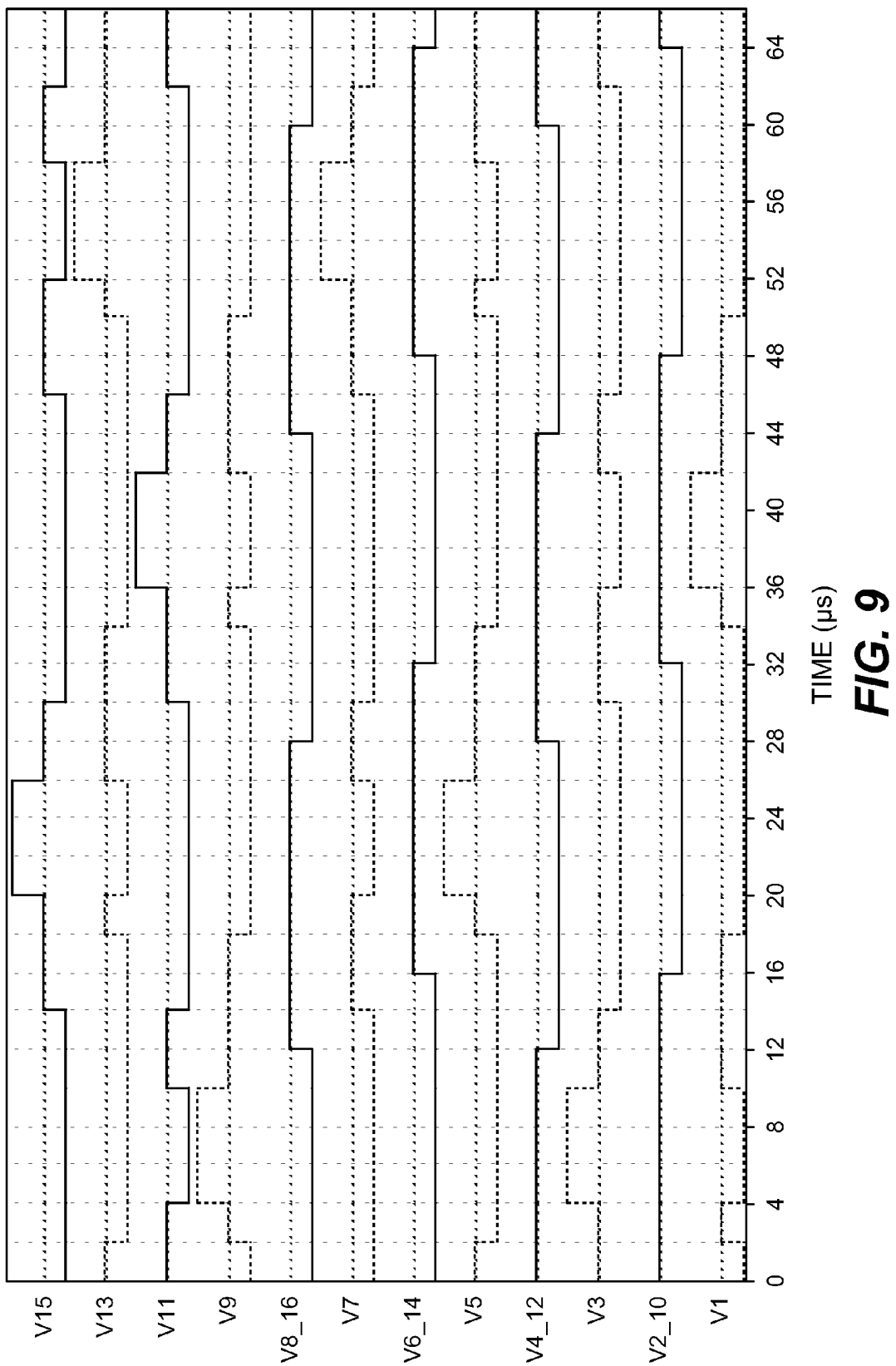
FIG. 9 is the timing diagram of the 16 VCCD gates for a 4 row summing process.

FIG. 8 shows the image sensor pixel array 100 in a different form with the VCCD 130 gates V1 through V16 shown. There are two gates per line and only four columns of the pixel array are shown. The control voltages vs. time to cause the summing of 4 lines of charge is shown in FIG. 9.

The summing process is easily extendable beyond four lines. Transferring the lines of summed charge in FIG. 6 down another two rows; an additional line of charge may be summed two more times to make the total sum equal to 6 lines of charge. It can be extended to any even number of lines equal to 2n+2 where n=1, 2, 3, 4 . . . . The starting point of the summing process is offset between two colors of each column so as to separate the centers of the sums of different colors.

Thus far the present invention discloses how to sum together four lines of charge packets to increase the frame rate by a factor of four or more. A 10 megapixel or larger pixel array would need at least a factor of 8 increase in frame rate to achieve 30 frames/second. The solution to faster image read out is to also sum together charge packets in the HCCD and use a HCCD that can clock out the charge packets in a horizontal charge summing mode with ½ the number of clock cycles than when operated in full resolution mode.

Figure 1:
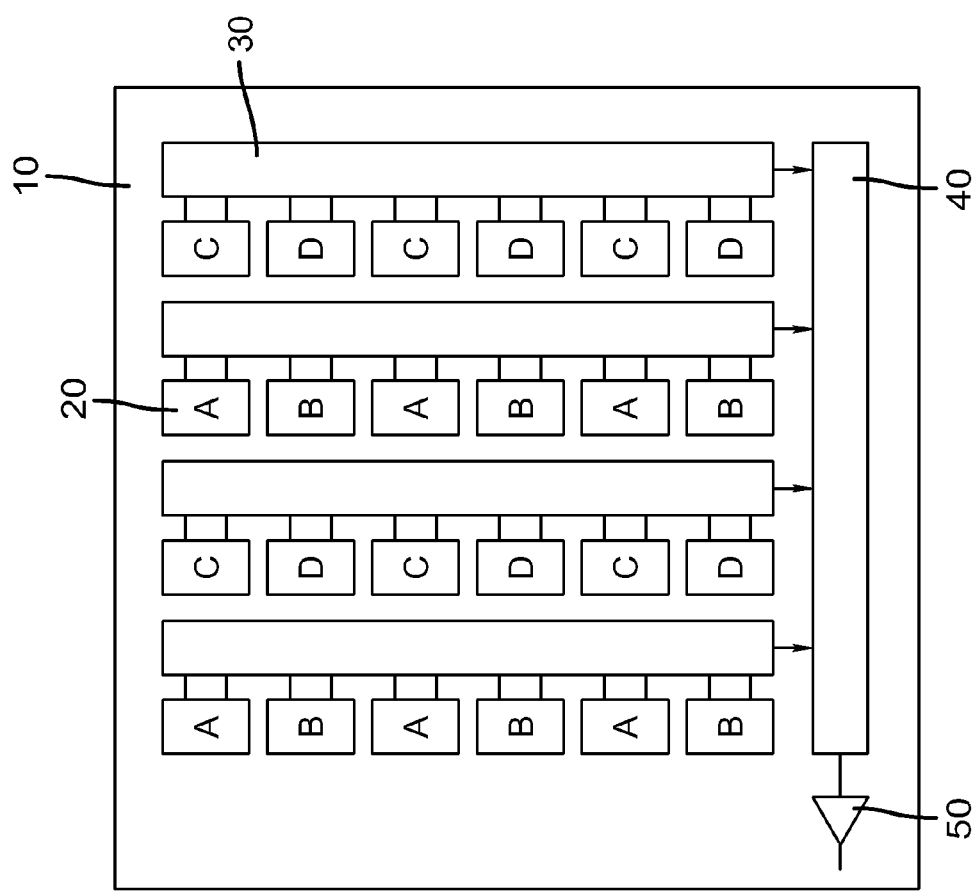
FIG. 1 is a prior art image sensor.
Figure 10:
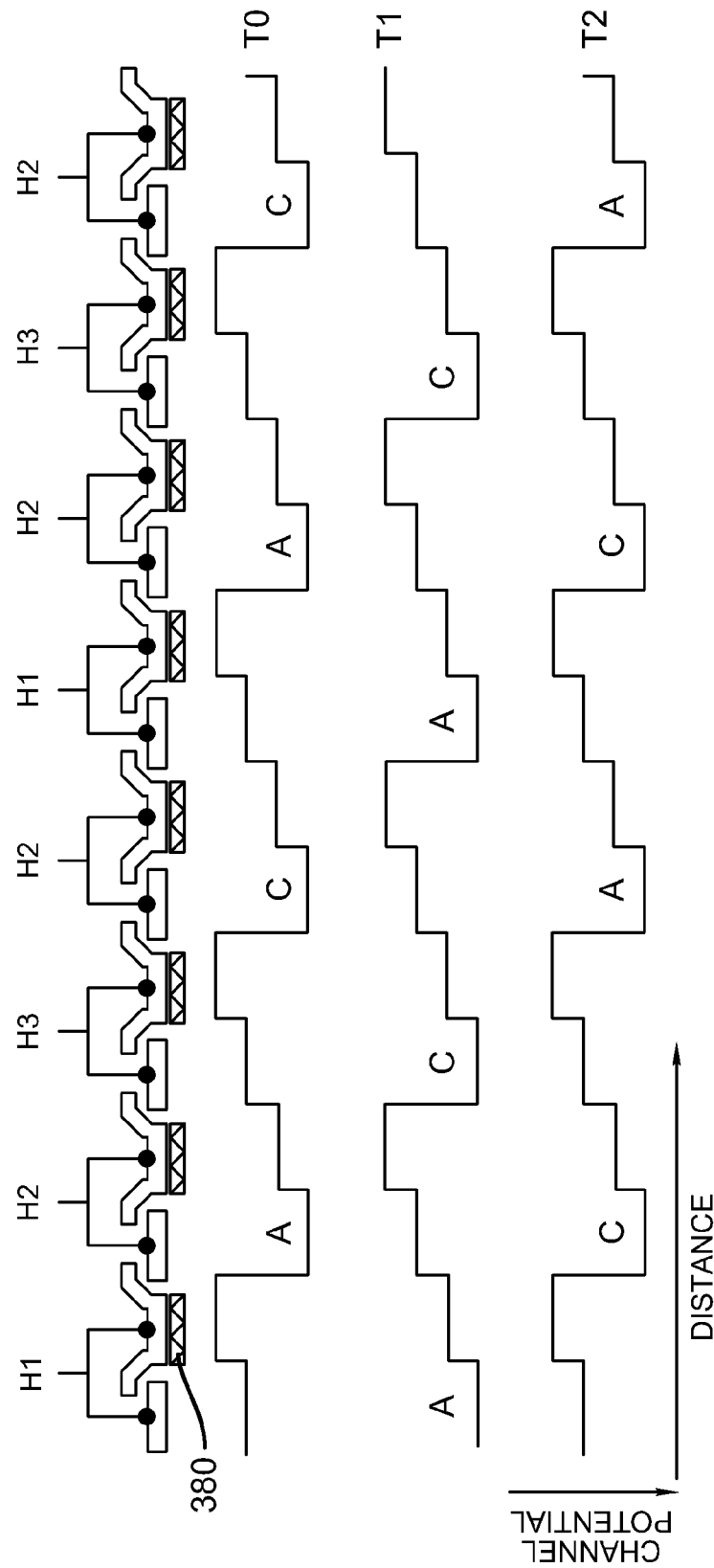
FIG. 10 is a prior art diagram of a pseudo-2-phase HCCD.
Figure 11:
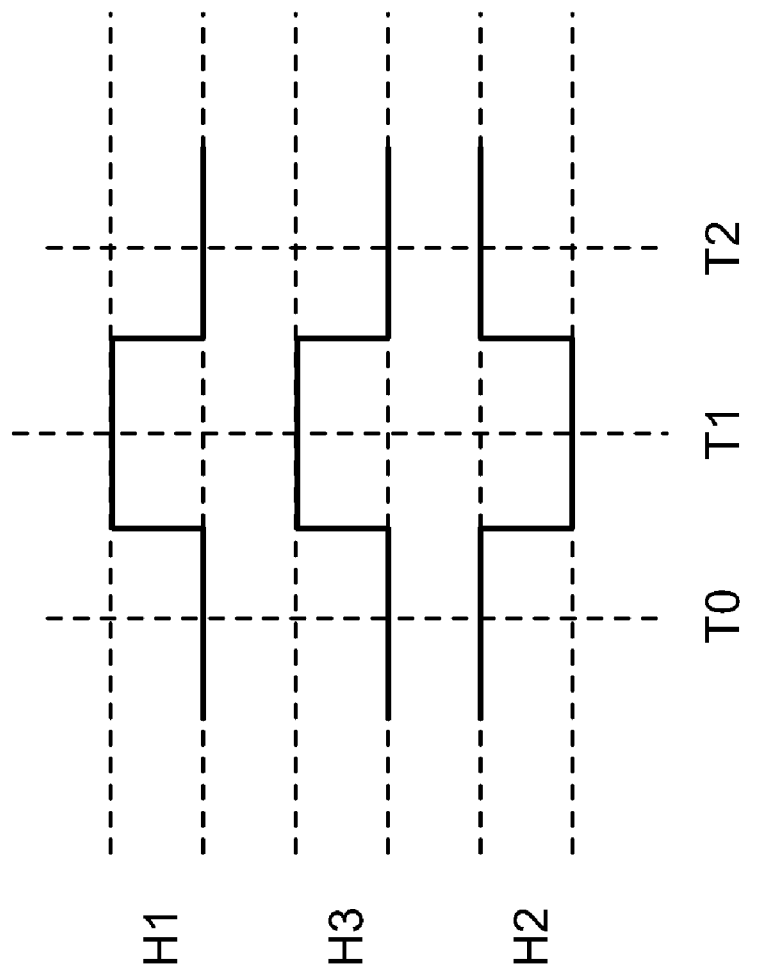
FIG. 11 is a prior art timing diagram for FIG. 10.

Referring to FIG. 10, there is shown a well-known prior art HCCD. It is a pseudo-two phase CCD employing four control gates per column. Each pair of two gates H1, H2 and H3 are wired together with a channel potential implant adjustment 380 under one of the two gates. The channel potential implant adjustment 380 controls the direction of charge transfer in the HCCD. Charge is transferred from the VCCD one line at a time under the H2 gates of the HCCD. FIG. 10 shows the presence of charge packets from the line containing colors A and C from FIG. 1. The charge packets are advanced serially one row through the HCCD at time steps T0, T1, and T2, by applying the clock signals of FIG. 11.

Figure 12:
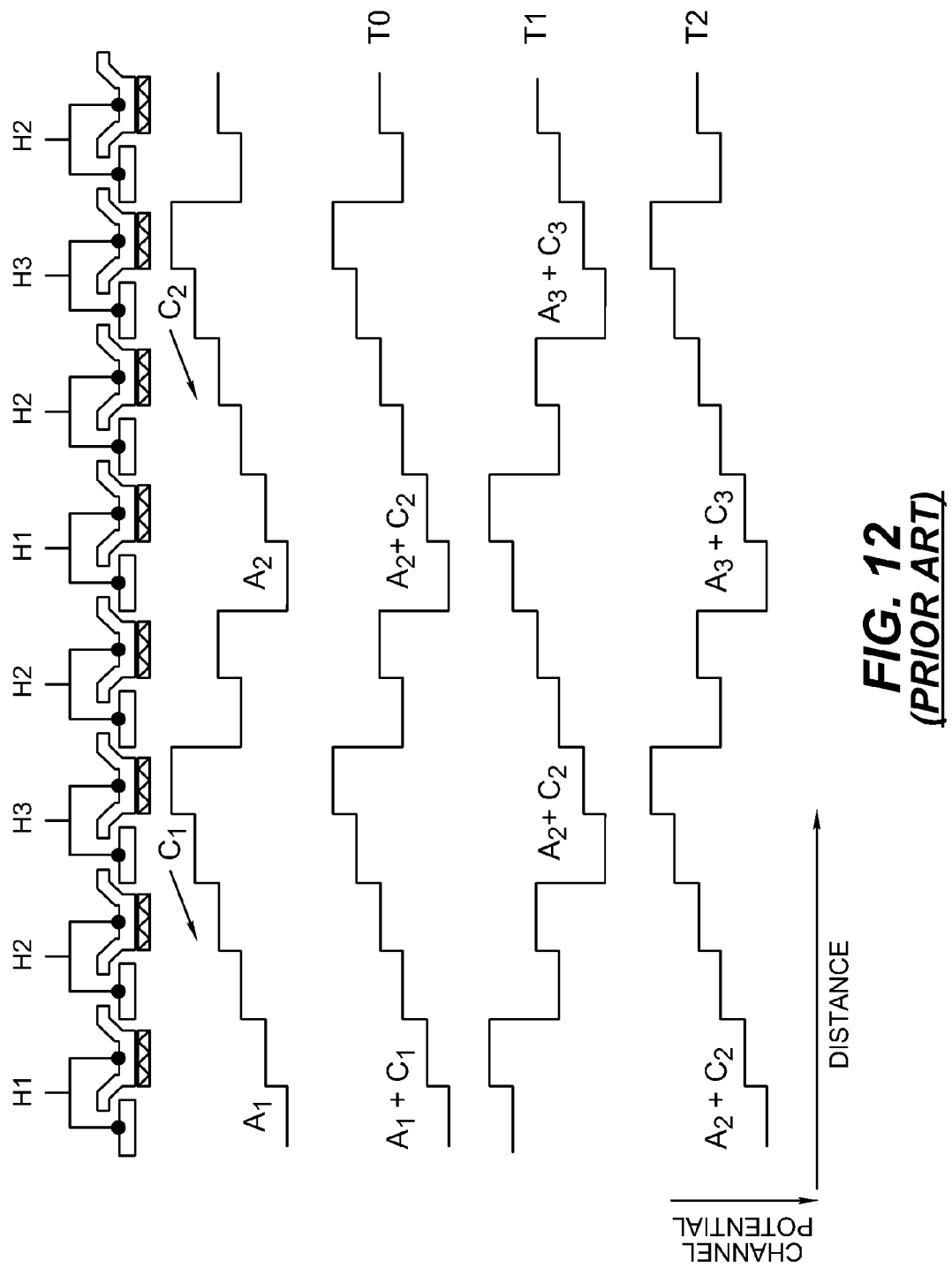
FIG. 12 is a prior art double speed HCCD.
Figure 13:
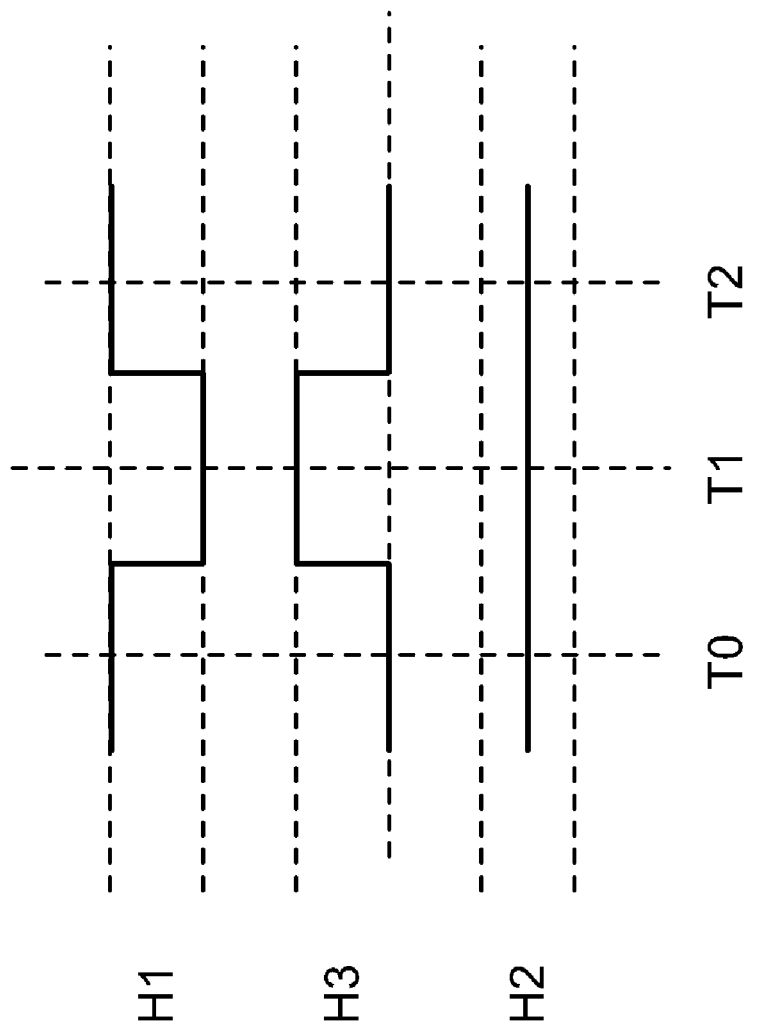
FIG. 13 is a prior art timing diagram for FIG. 12.

U.S. Pat. No. 6,462,779 provides a method of summing two pixels in the HCCD to reduce the total number of HCCD clock cycles in half. This is shown in FIG. 12. This method is designed for linear image sensors where all pixels are of one color. In a two dimensional array employing the 2×2 color pattern of FIG. 2, each line has more than one color. Thus, in FIG. 12 when a line containing colors A and C is transferred into the HCCD and clocked with the timing of FIG. 13 the colors A and C are added together. That destroys the color information and the image.

Figure 14:
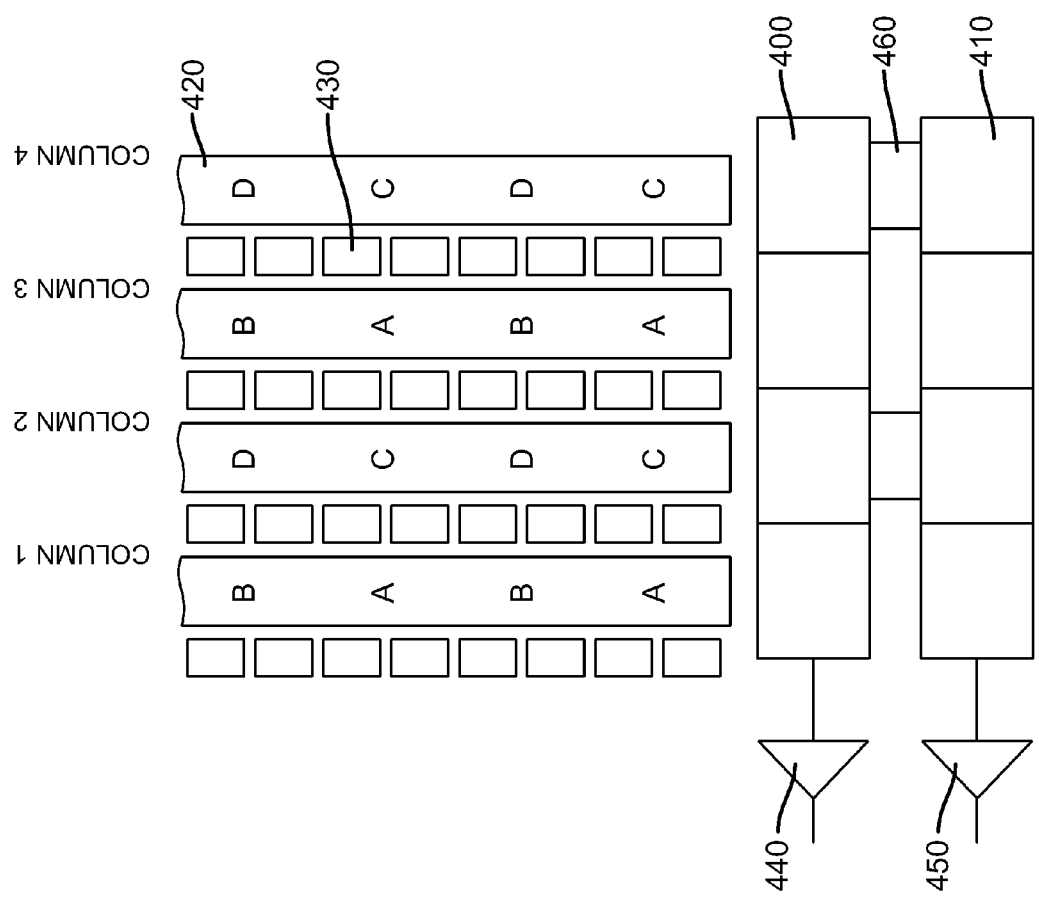
FIG. 14 is the dual output HCCD.

The present invention shown in FIG. 14 provides a method to prevent the mixing of colors when summing pixels in the HCCD. The invention consists of an array of photodiodes 430 covered by a 2×2 color filter pattern of four colors A, B, C, and D. Charge packets from the photodiodes 430 are transferred and summed vertically in the VCCD 420 using the four line summing described earlier. The result of four line summing is depicted in FIG. 14. There is a first HCCD 400 and a second HCCD 410 located at the bottom of the pixel array. There is a transfer channel 460 every other column for the purpose of transferring half of the charge packets from the first HCCD 400 to the second HCCD 410. There is an output amplifier 440 and 450 at the end of each HCCD for converting the charge packets to a voltage for further processing.

FIGS. 15a-15d show the charge transfer sequence for reading out one line through the HCCD. First in FIG. 15a, one line containing colors A and C is transferred into the first HCCD 400 as shown in FIG. 15b. Charge packets are labeled with a letter corresponding to the color and a subscript corresponding to the column from which the charge packet originated. In FIG. 15c, the charge packets from the even numbered columns only pass through the transfer gate 460 and into the second HCCD 410. In FIG. 15d, the charge packets in the second HCCD 410 are advanced by one column to align them with the charge packets in the first HCCD 400. The number of clock cycles needed to read out each HCCD is equal to one half the number of columns in the HCCD. The addition of a second HCCD 410 reduces the read out time by half. Most importantly, each HCCD now contains only one color type.

Figure 16A:
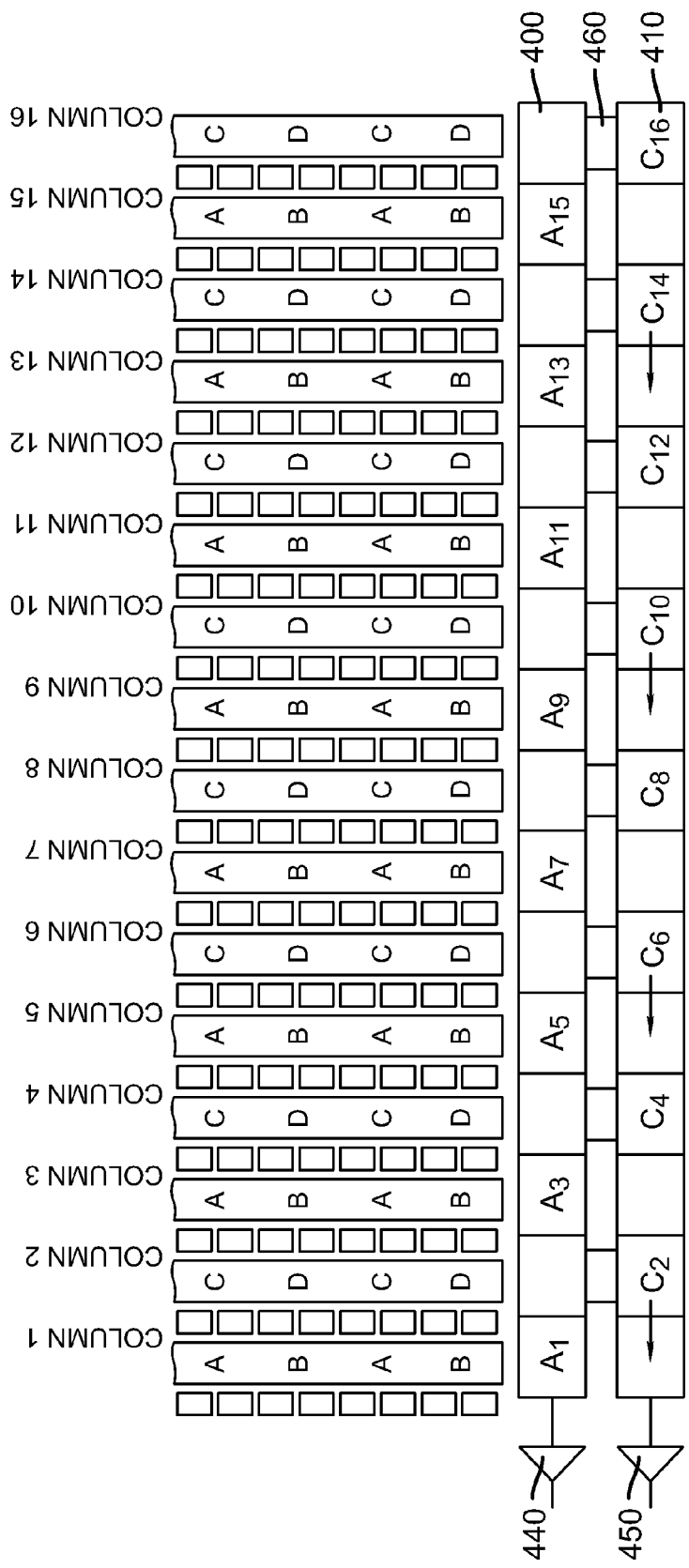
FIGS. 16a-16d is shows the flow of charge for summing two charge packets of the same color for dual output double speed HCCD.
Figure 16B:
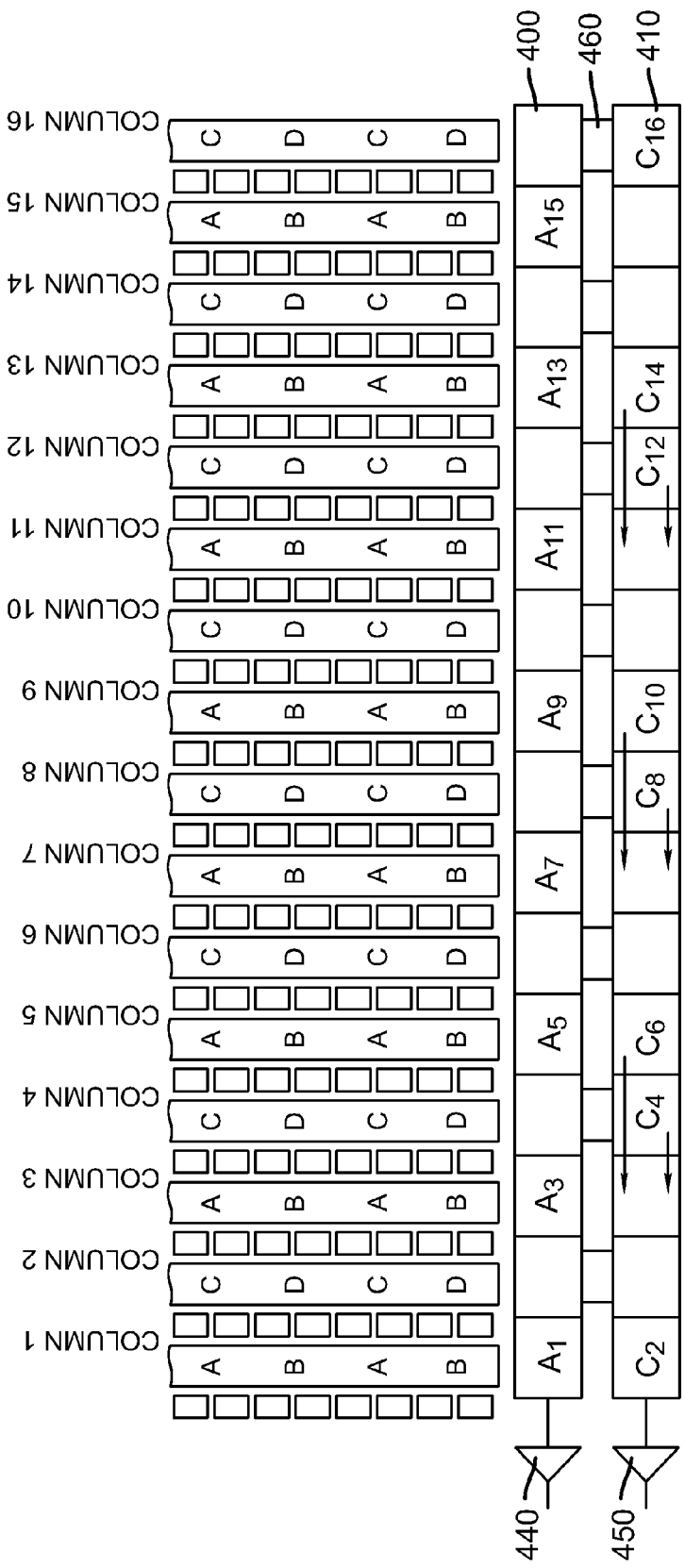
Figure 16C:
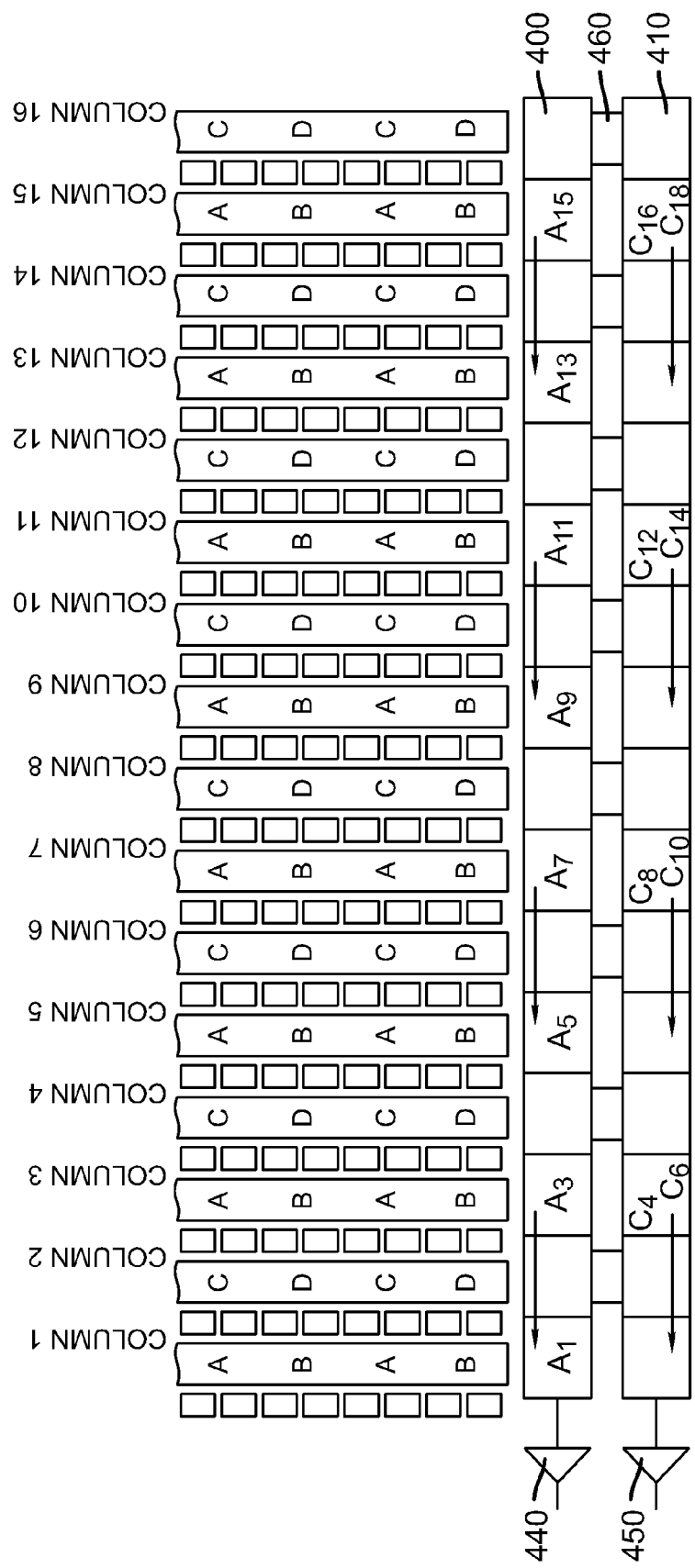
Figure 16D:
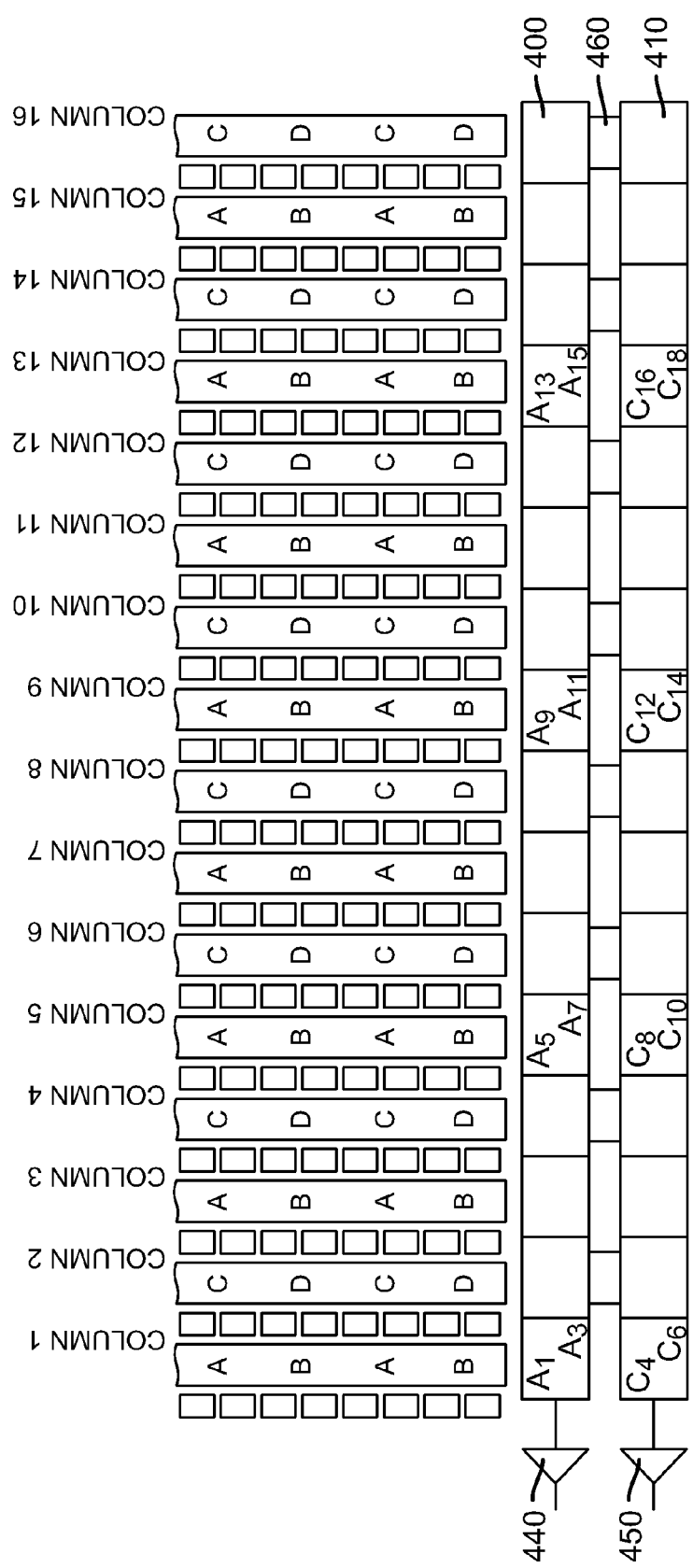
Figure 17:
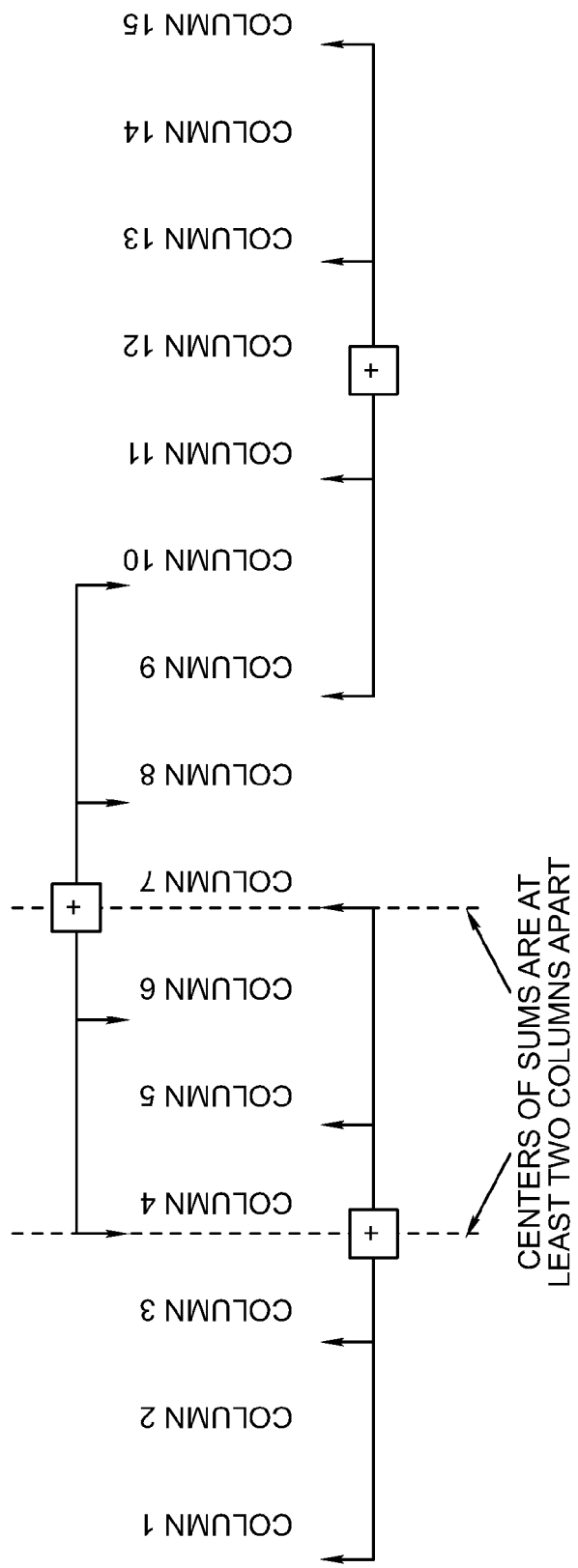
FIG. 17 shows the preferred summing of columns of the same color.
Figure 18:
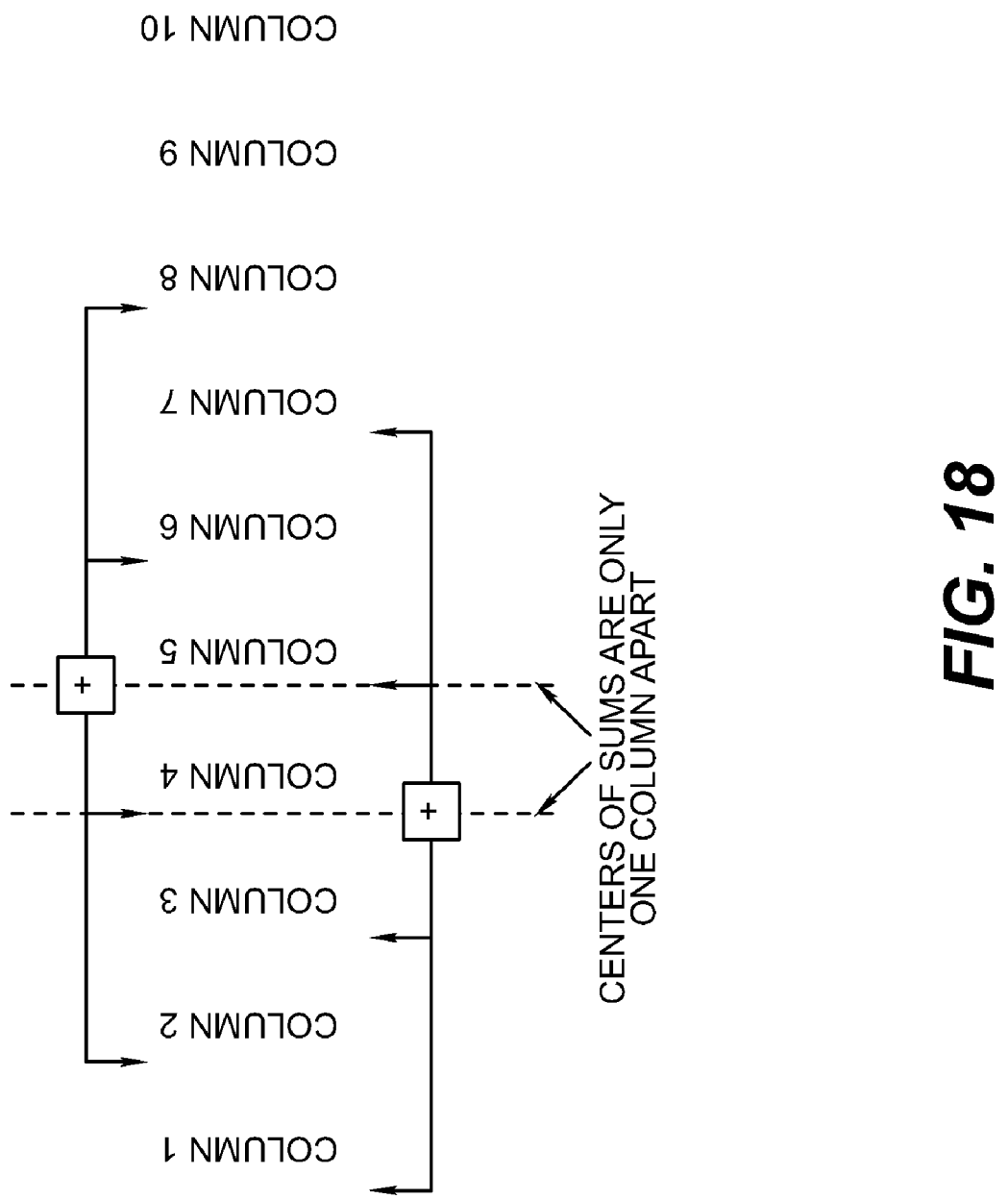
FIG. 18 shows the disadvantaged summing of columns of the same color.

Two charge packets may be summed together horizontally in each HCCD 400 and 410 as shown in FIGS. 16a through 16d. The summing is done without mixing charge packets of different colors. Of particular interest is FIGS. 16b and 16c where charge in HCCD 410 is advanced two columns ahead of charge in HCCD 400. This aligns the sum of columns 1+3 with the sum of columns 4+6. Now if those charge packets are summed together with the next set of charge packets on the output amplifier floating diffusion, then there will be a four columns sum of columns 1+3+5+7 from HCCD 400 and columns 4+6+8+10 from HCCD 410. This summing process produces a better spacing of the centers of the summed pixels as shown in FIG. 17. FIG. 18 shows how the centers of the summed pixels are not separated properly if the extra HCCD columns shift of FIGS. 16b and 16c is not performed.

The two pixel summing reduces the number of charge packets to read out of each HCCD 400 and 410 by a factor of two. This HCCD design provides a total speed improvement of a factor of four. Combined with the four line summing described earlier allows an eight or sixteen fold increase in frame rate for a video mode. That is enough to allow sampling of all pixels in a multi-million-pixel image sensor at a frame rate of 30 frames/second.

Figure 19:
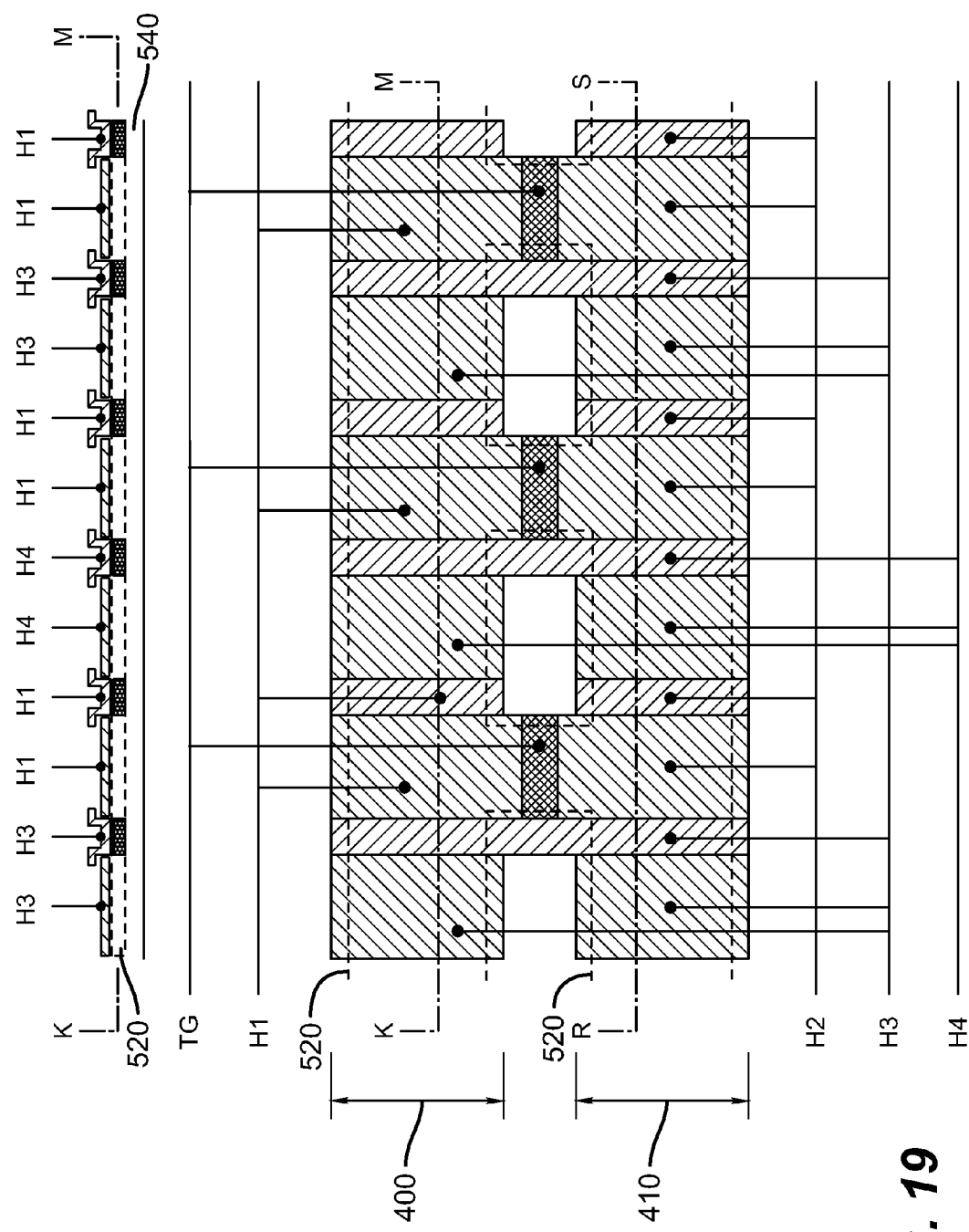
FIG. 19 is the dual output double speed HCCD gate electrode detail.

FIG. 19 shows the HCCD structure in greater detail. There is the first HCCD 400 and second HCCD 410 fabricated on top of an n-type buried channel CCD 520 in a p-type well or substrate 540. The top portion of FIG. 19 shows the side view cross section K-M through the first HCCD 400. There are seven wires, which supply the control voltages to the HCCD gates H1 through H4. An additional wire TG controls the transfer gate between the two HCCDs 400 and 410. The gate electrodes are typically, but not required to be, poly-silicon material of at least two levels. A third level of poly-silicon may be used for the transfer gate if the manufacturing process used does not allow the first or second levels of poly-silicon to be used. With careful use of implants in the buried channel of the transfer gate region and slightly modified gate voltages the transfer gate can be omitted entirely. The exact structure of the transfer gate is not important to the function of the invention.

Figure 20:
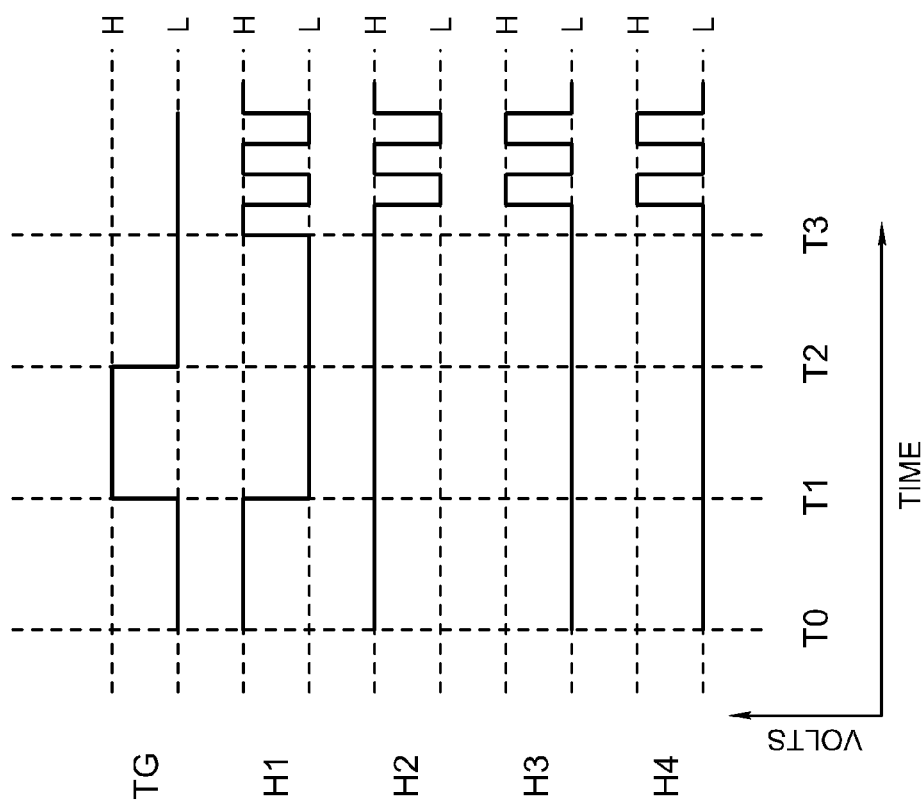
FIG. 20 is the timing diagram for FIGS. 16a-16d.

The clock voltages applied to the HCCD of FIG. 19 are shown in FIG. 20 for transfer of charge from the first HCCD to the second HCCD. At time T1 of FIG. 20 the H1, H3 and H4 gates are held low to receive charge from the VCCD 400. The H2 and TG gates are held high so that charge flows through the first HCCD 400 across the transfer gate TG and into the second HCCD 410. Charge from columns not aligned with the transfer gates TG remains in gates H3 and H4. At time T3 the gates H3 and H4 are clocked opposite of gates H1 and H2 to advance charge serially through both HCCDs toward the output amplifier at the end of each HCCD.

Figure 21:
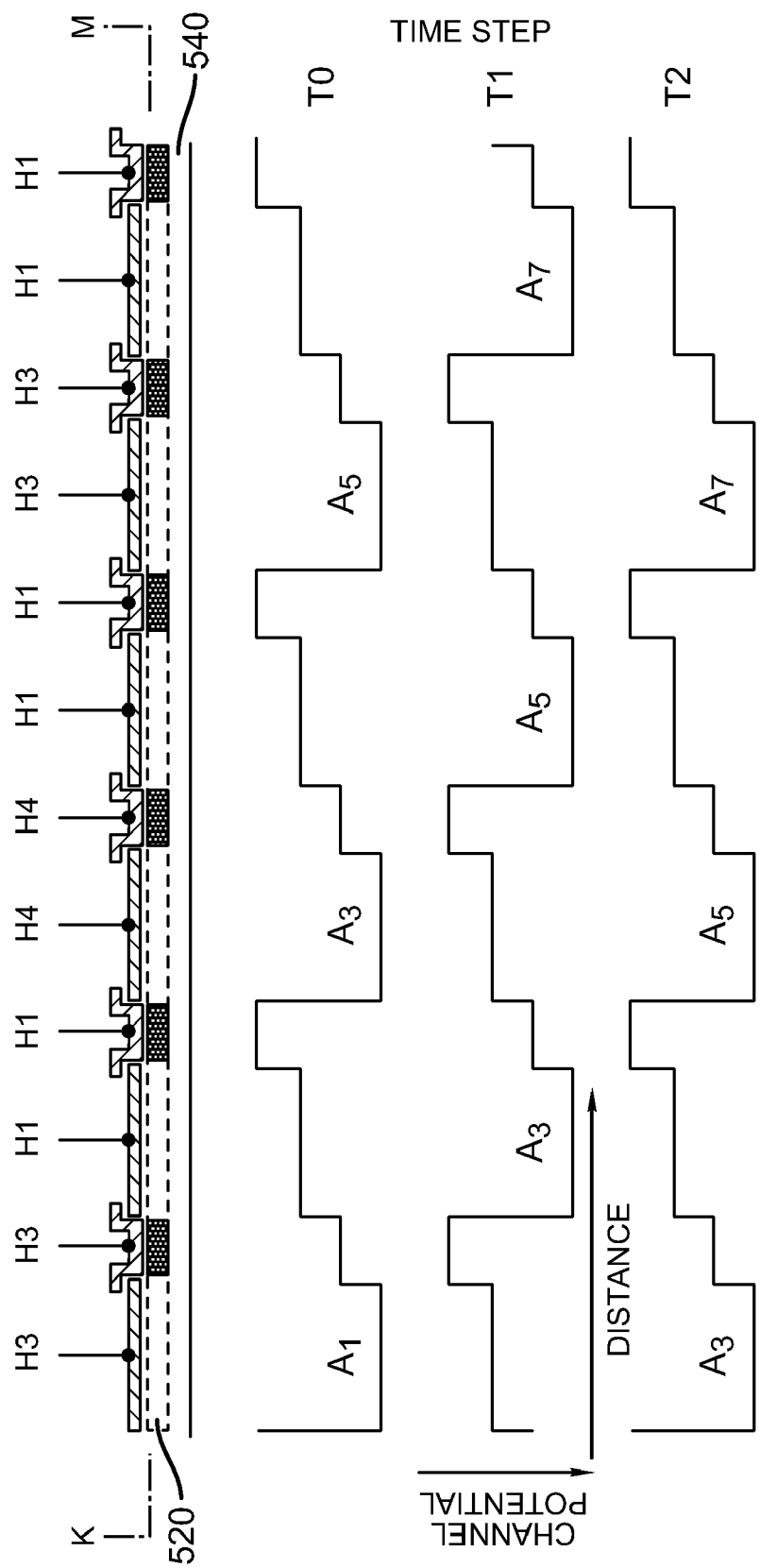
FIG. 21 is the cross section KM of HCCD 400 in FIG. 19.
Figure 22:
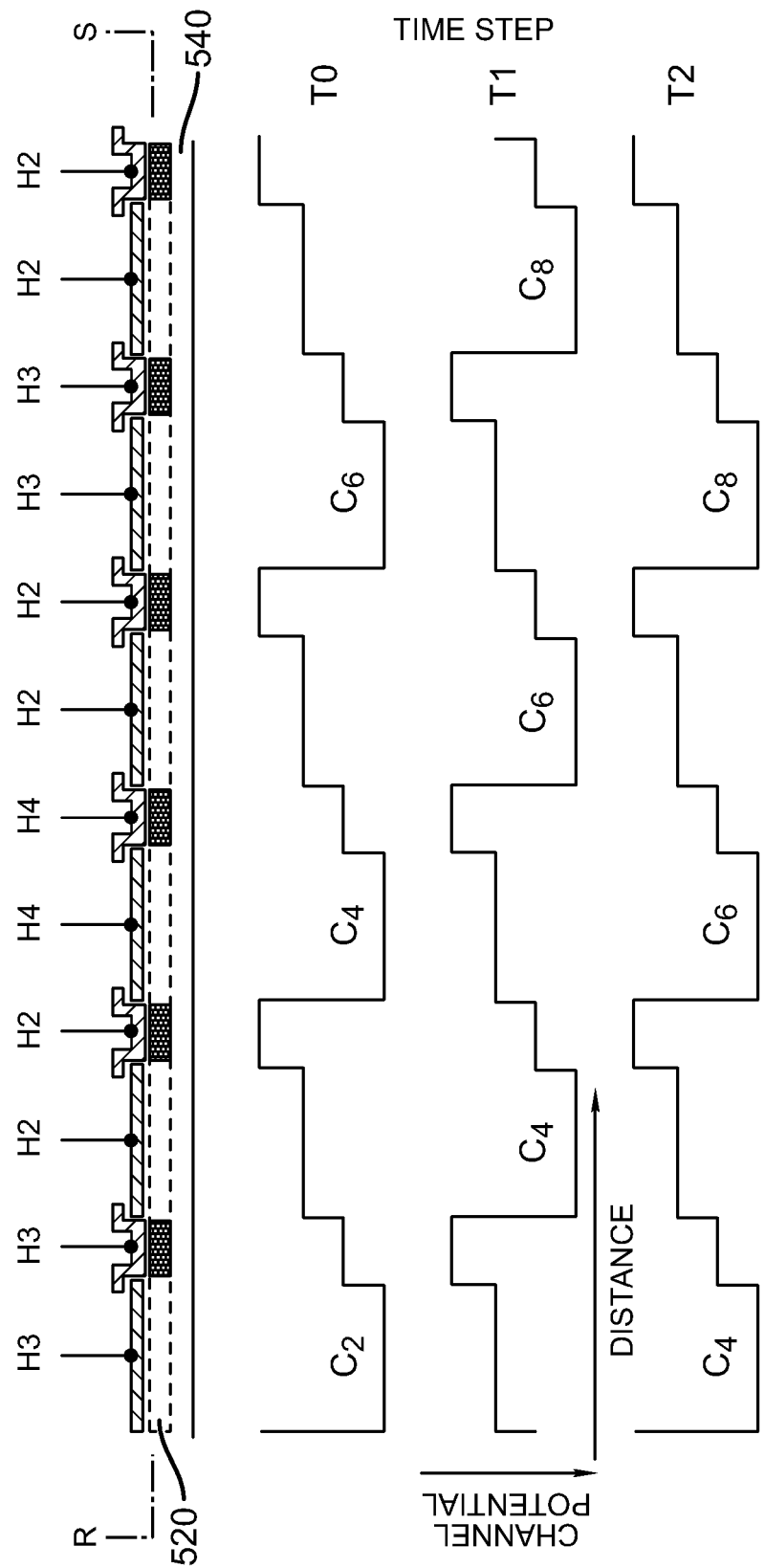
FIG. 22 is the cross section RS of HCCD 410 in FIG. 19.
Figure 23:
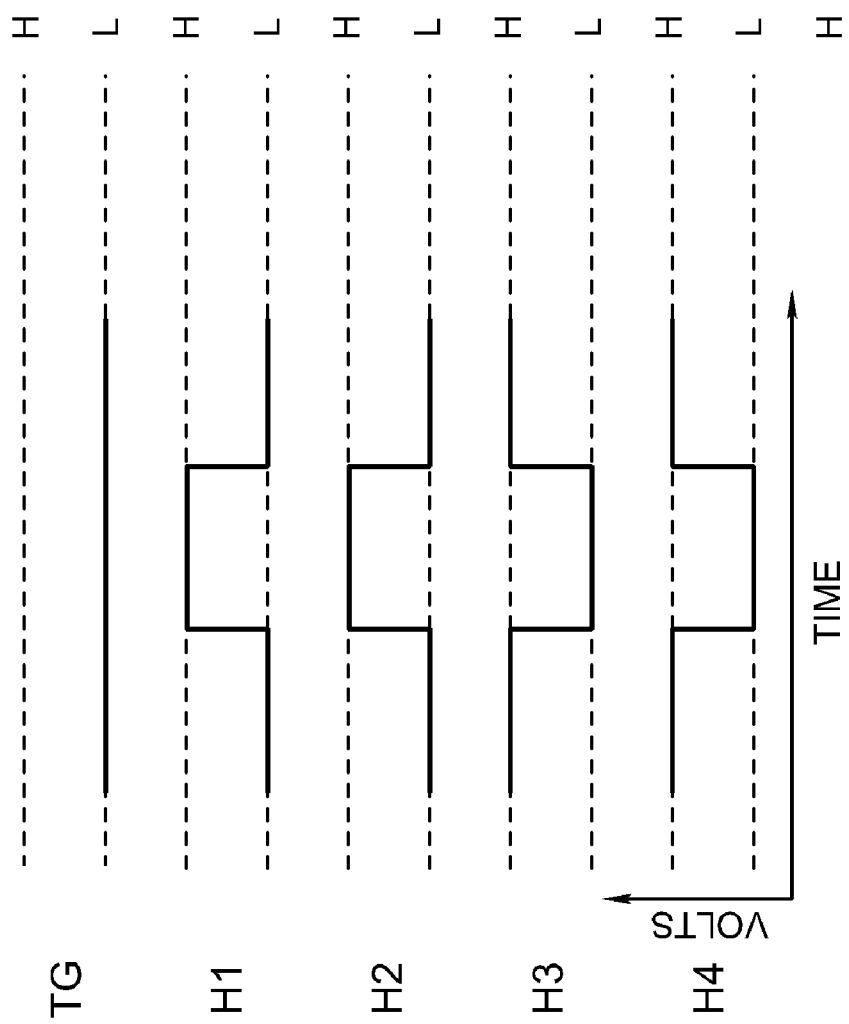
FIG. 23 if the timing diagram for FIGS. 21 and 22.

The following discusses the readout of the HCCD in full resolution mode for still photography. FIG. 21 shows the charge transfer sequence for the first HCCD 400 and FIG. 22 shows the charge transfer sequence for the second HCCD 410. A letter corresponding to the color of the charge packet, A, B, C, or D, identifies the charge packets. The subscript on the charge packet label corresponds to the column number of the charge packet. The clock voltages for each time step are shown in FIG. 23. Each HCCD is clocked as a pseudo 2-phase CCD between two voltages H and L. The transfer gate TG is held in the off state (L) to prevent mixing of charge between the two HCCDs.

Figure 24:
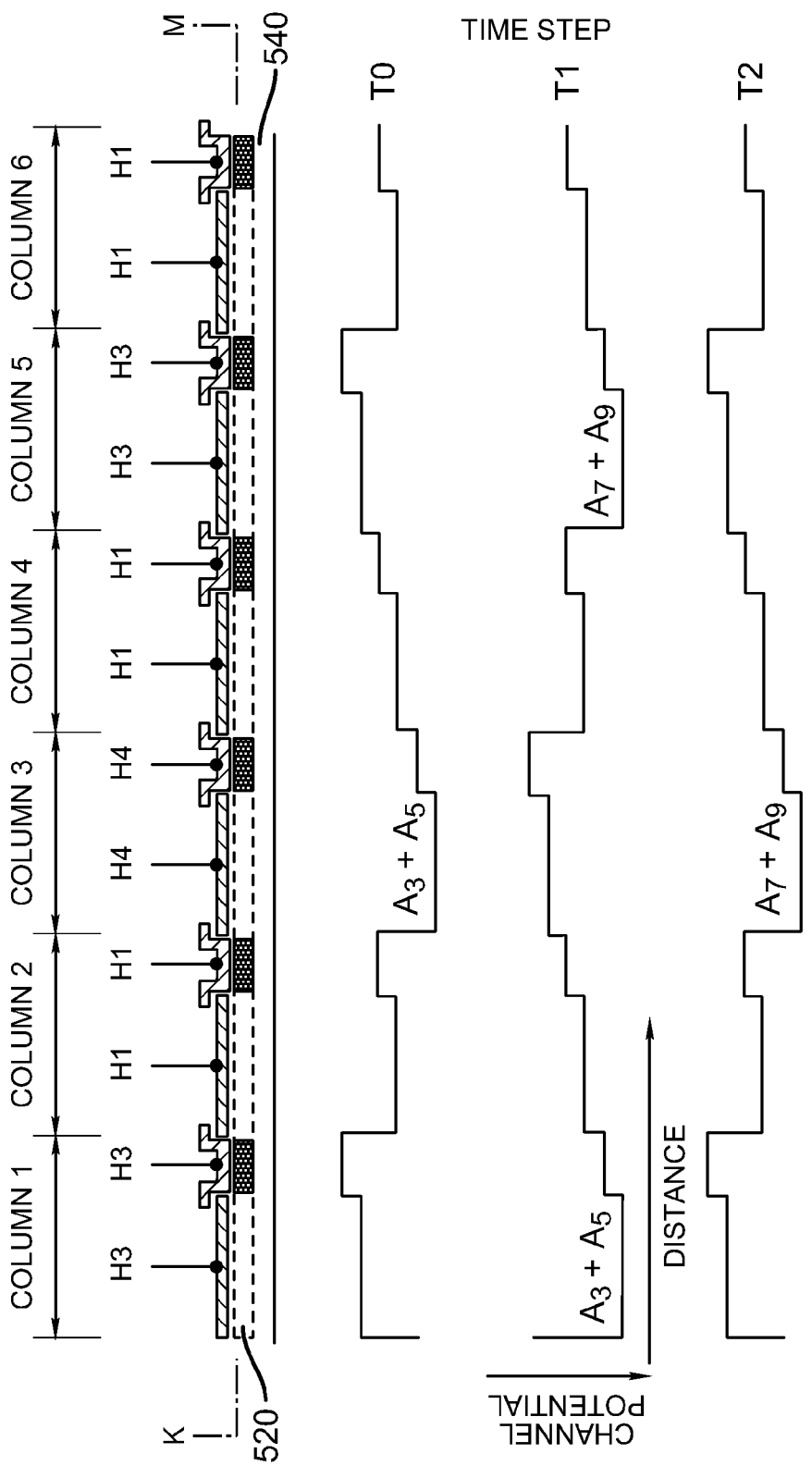
FIG. 24 is the cross section KM of HCCD 400 in FIG. 19 operated in double speed mode.
Figure 25:
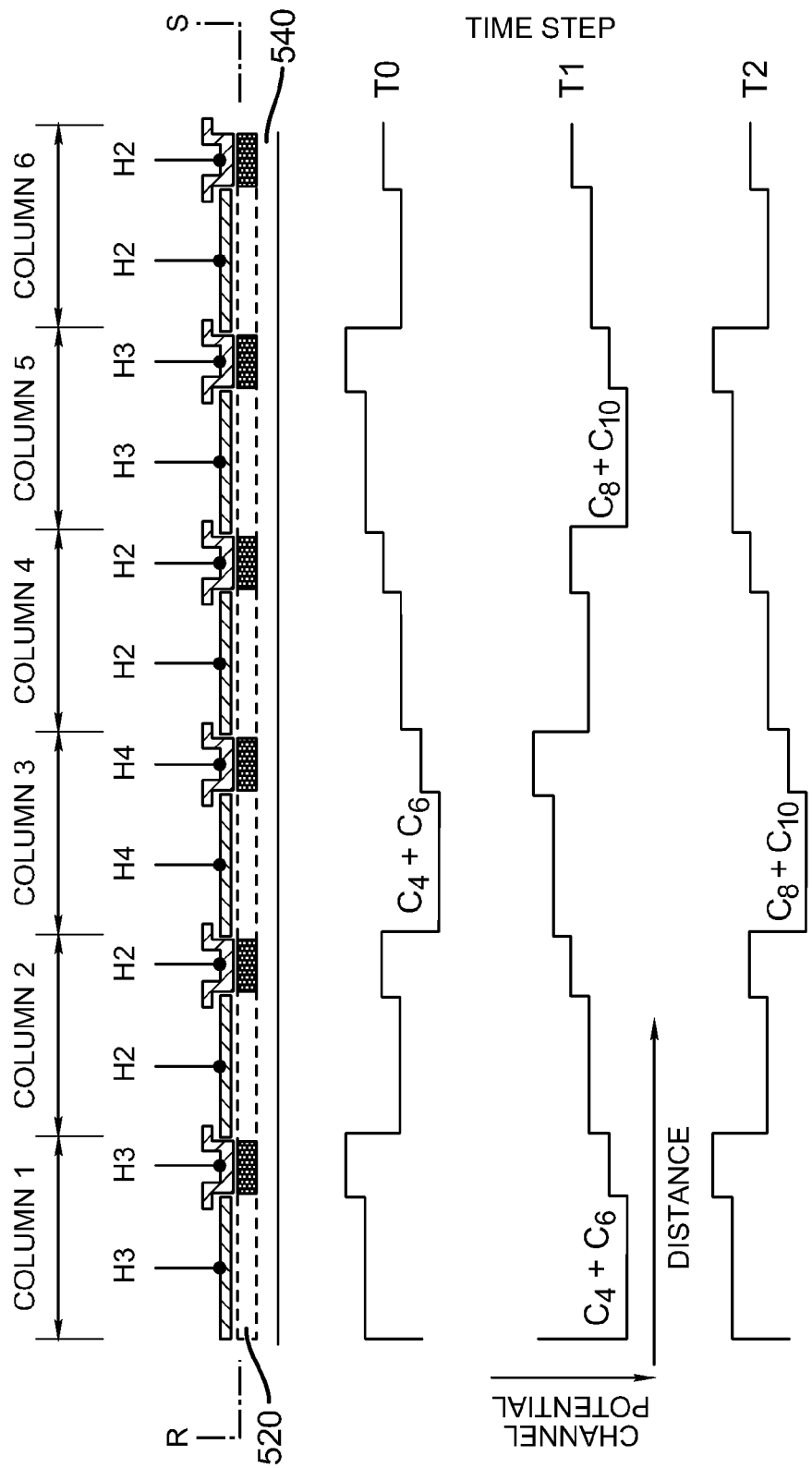
FIG. 25 is the cross section RS of HCCD 410 in FIG. 19 operated in double speed mode.
Figure 26:
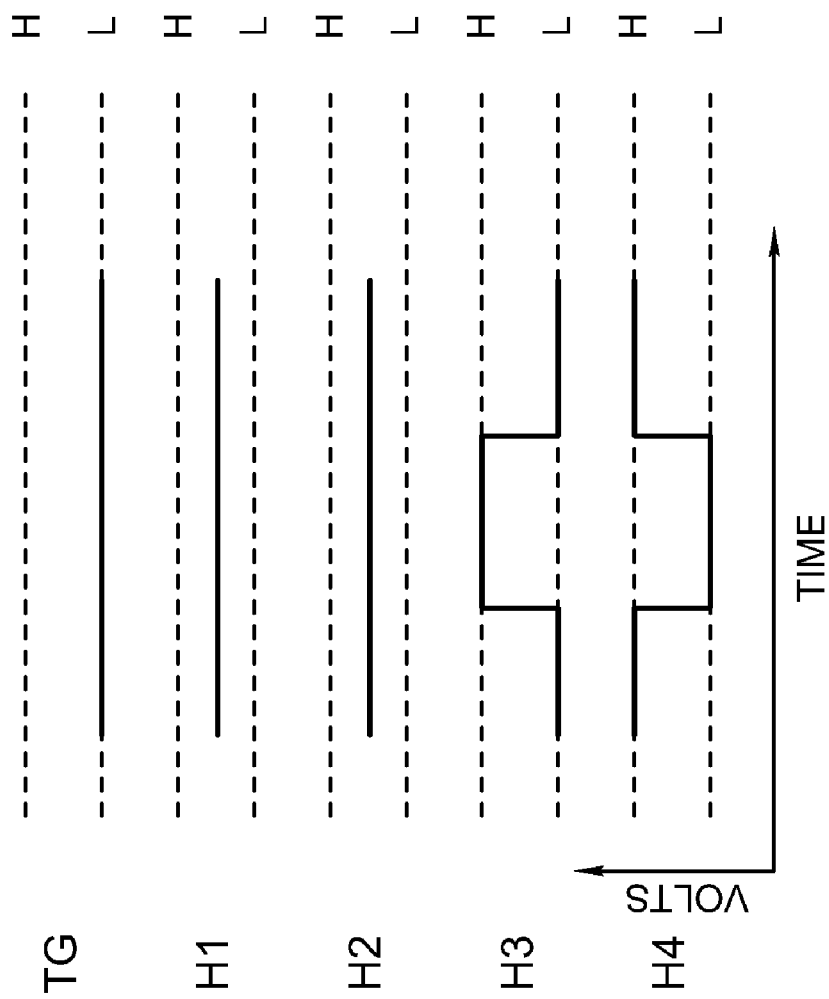
FIG. 26 is the timing diagram for FIGS. 24 and 25.
Figure 27:
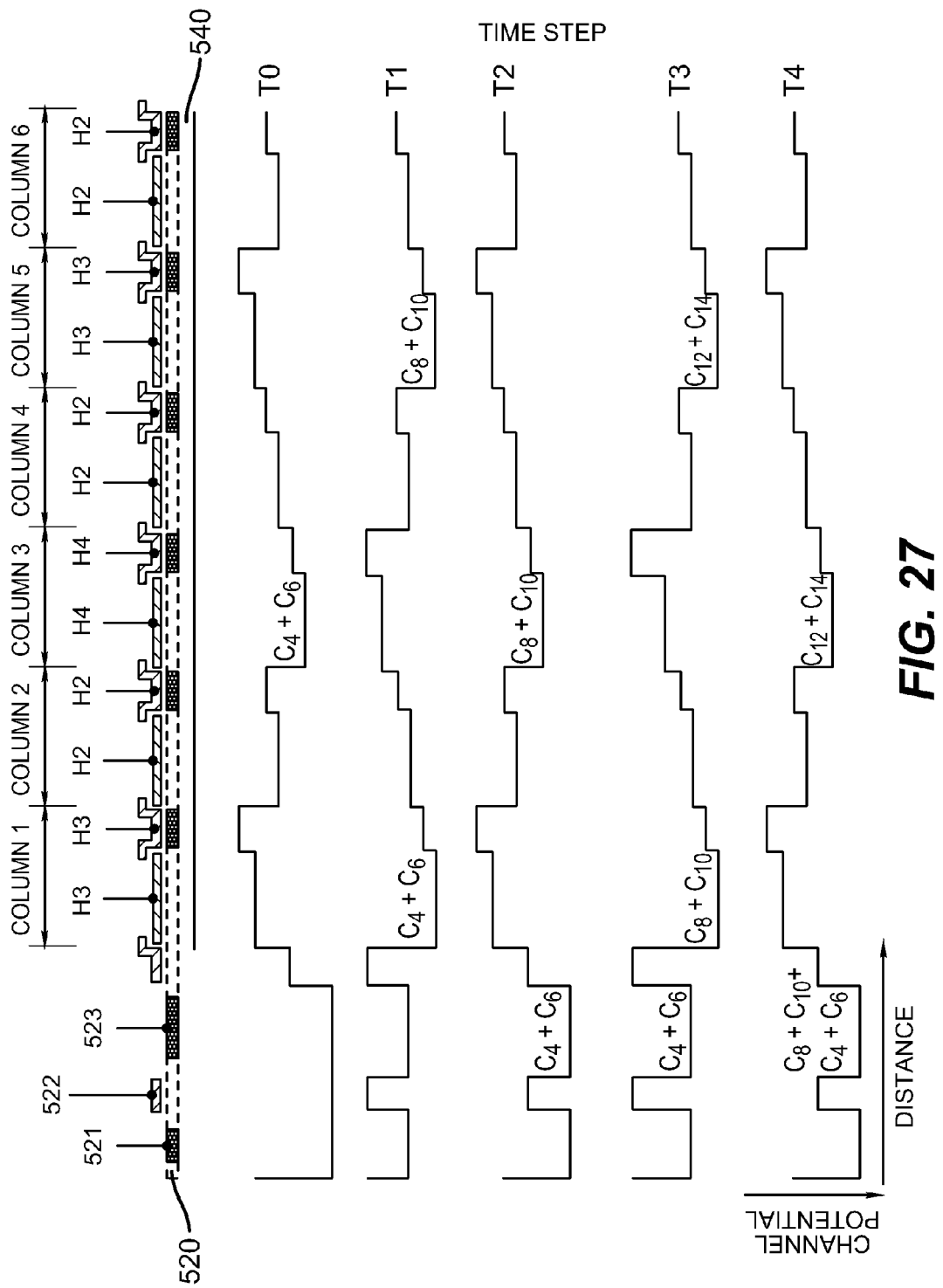
FIG. 27 shows the summing of charge packets at the floating diffusion output of each HCCD.

In video mode, two charge packets are summed together as shown in FIG. 24 for the first HCCD 400 and FIG. 25 for the second HCCD 410. Notice that the first HCCD only contains charge packets from pixels of color A and the second HCCD only contains charge packets from pixels of color C. FIG. 26 shows the gate voltage clocking sequence. Gates H1 and H2 are held constant at a voltage approximately halfway between H and L. The voltages H and L in video mode do not have to be equal to the voltages used for full resolution still photography. Only gates H3 and H4 are clocked in a complimentary manner. As can be seen in FIG. 25 one clock cycle advances the charge packets by four columns in the HCCD. This is what provides the factor of four-speed increase in video mode. This clocking scheme sums two charge packets of charge together. It is desired to sum an additional two charge packets together for a total sum of four columns. This is done at the output amplifier 521 of each HCCD as shown in FIG. 27. There is a reset gate 522 that resets the floating diffusion 523 every other HCCD clock cycle so that two charge packets from the HCCD are transferred onto the floating diffusion 523.

Due to the large number of photodiode charges being summed together there is the possibility of too much charge in the VCCD or HCCD causing blooming. The VCCD and HCCD can easily be overfilled. It is widely known that the amount of charge in a vertical overflow drain type photodiode is regulated by a voltage applied to the image sensor substrate. This voltage is simply adjusted to reduce the photodiode charge capacity to a level to prevent overfilling the VCCD or HCCD. This is the exact same procedure normally used even without summing together pixels.

Figure 28:
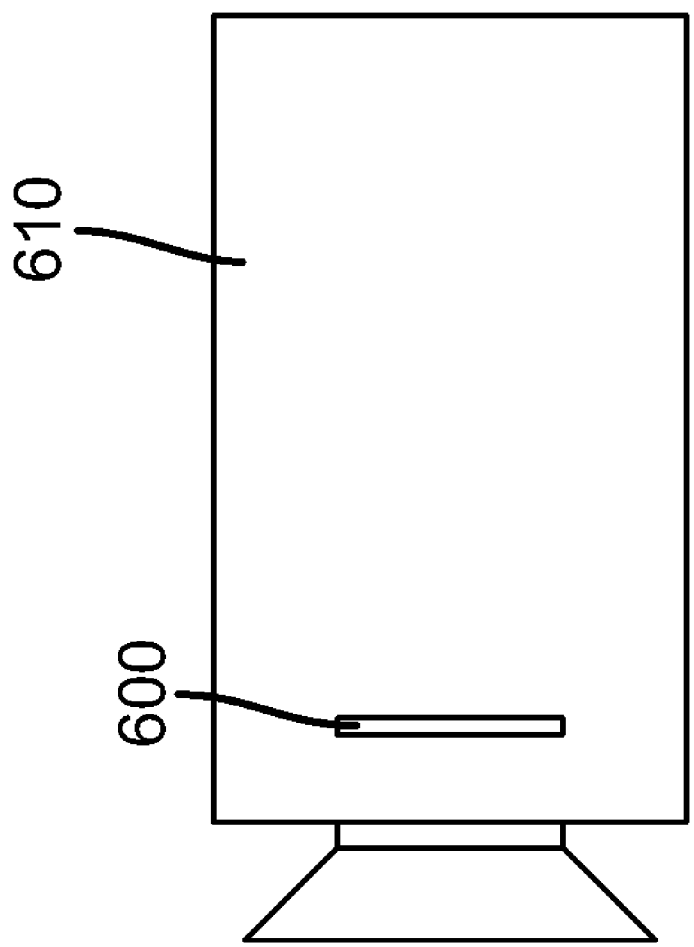
FIG. 28 is a camera using an image sensor of the present invention.
Figure 29:
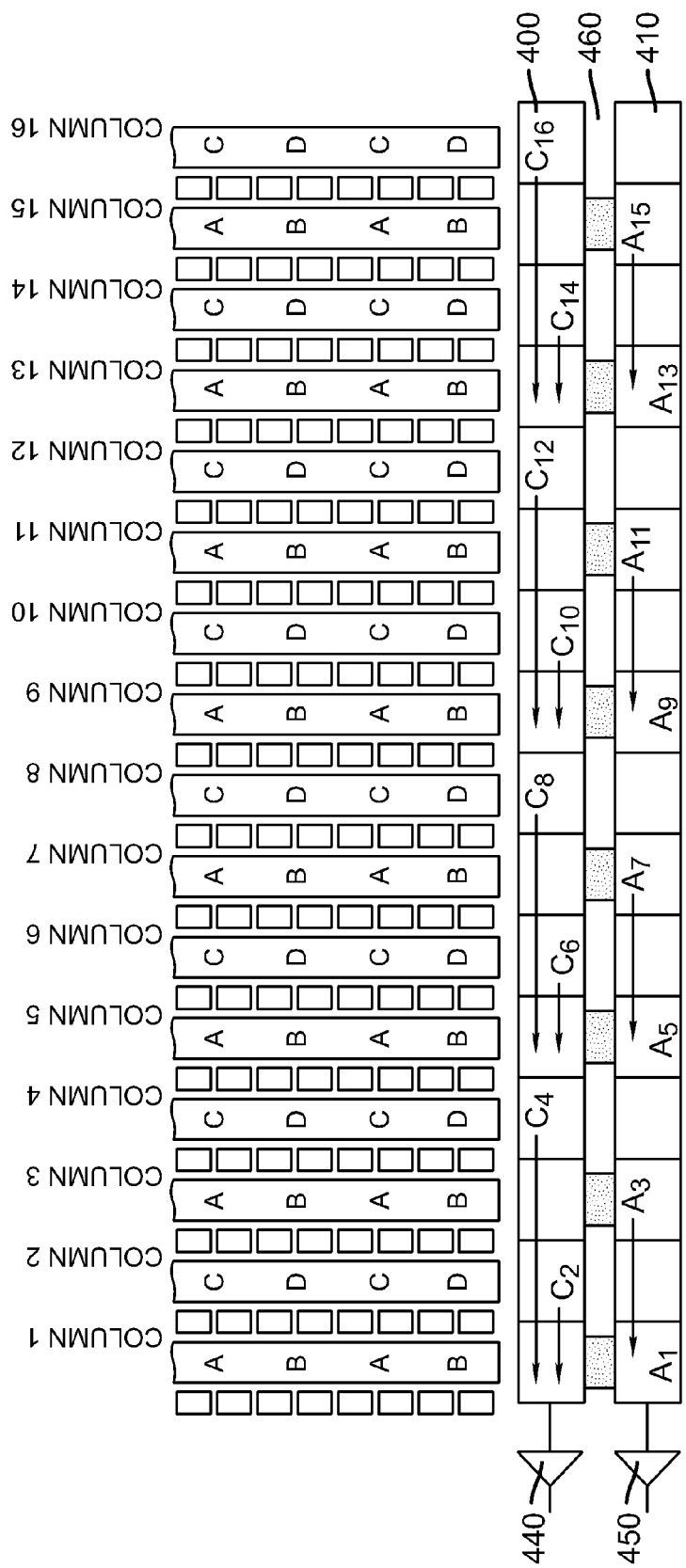
FIG. 29 is the location of charge packets at time step T0 of FIG. 32.
Figure 30:
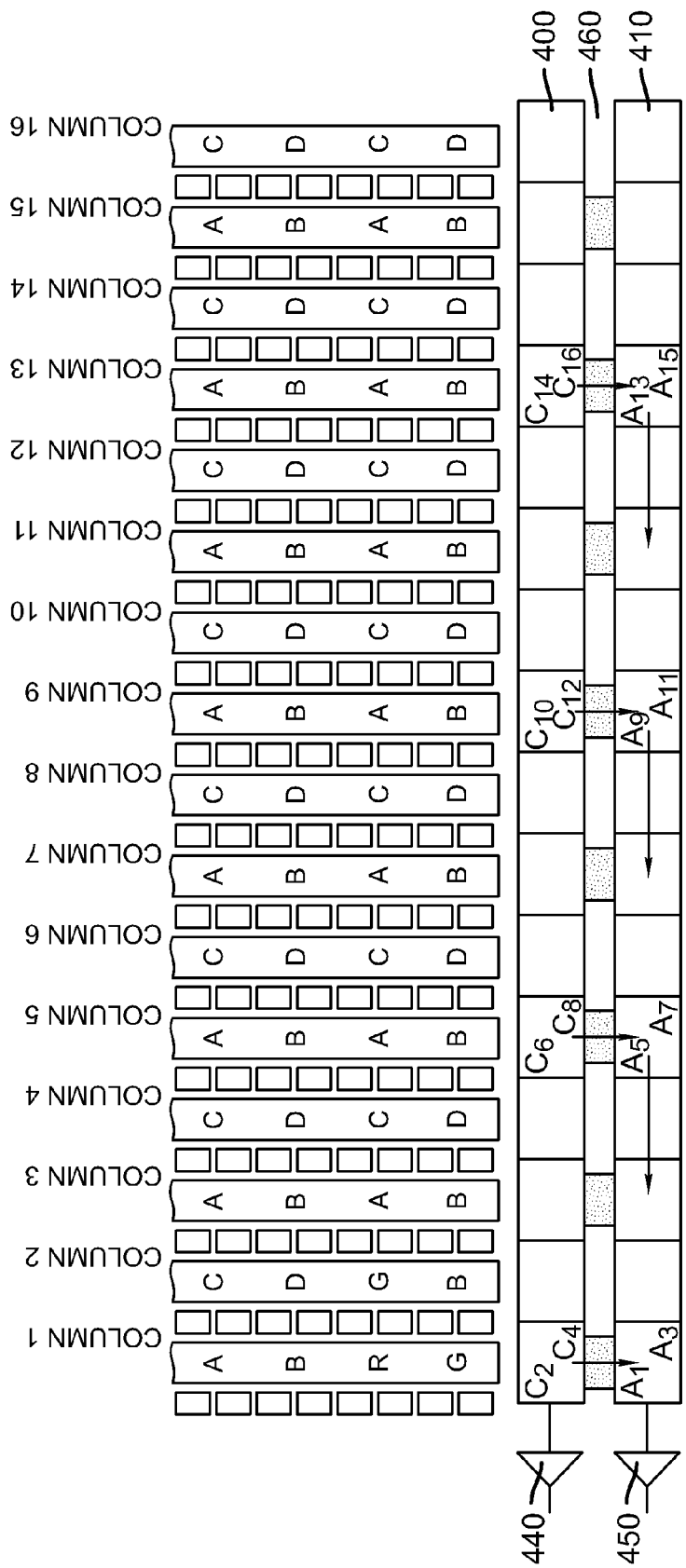
FIG. 30 is the location of charge packets at time step T1 of FIG. 32.
Figure 31:
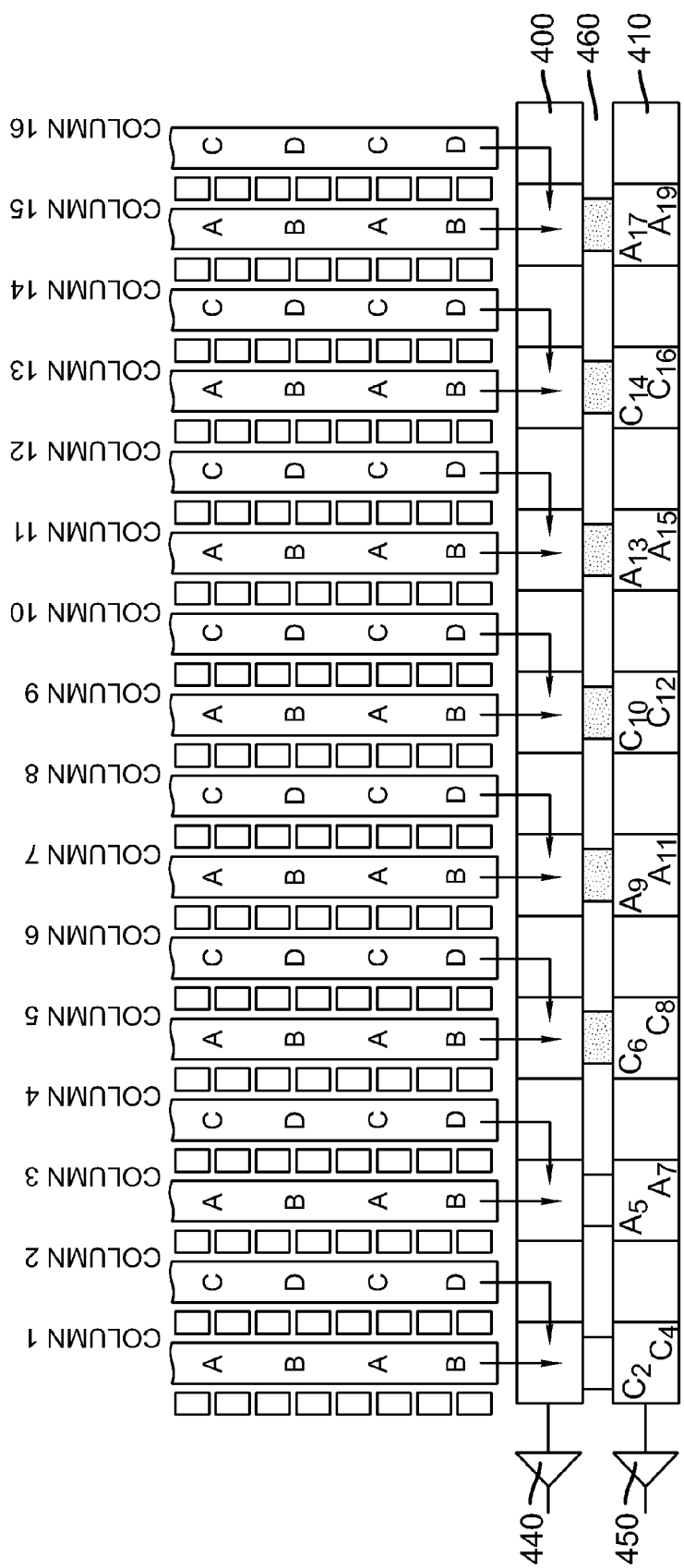
FIG. 31 is the location of charge packets at time step T2 of FIG. 32.
Figure 32:
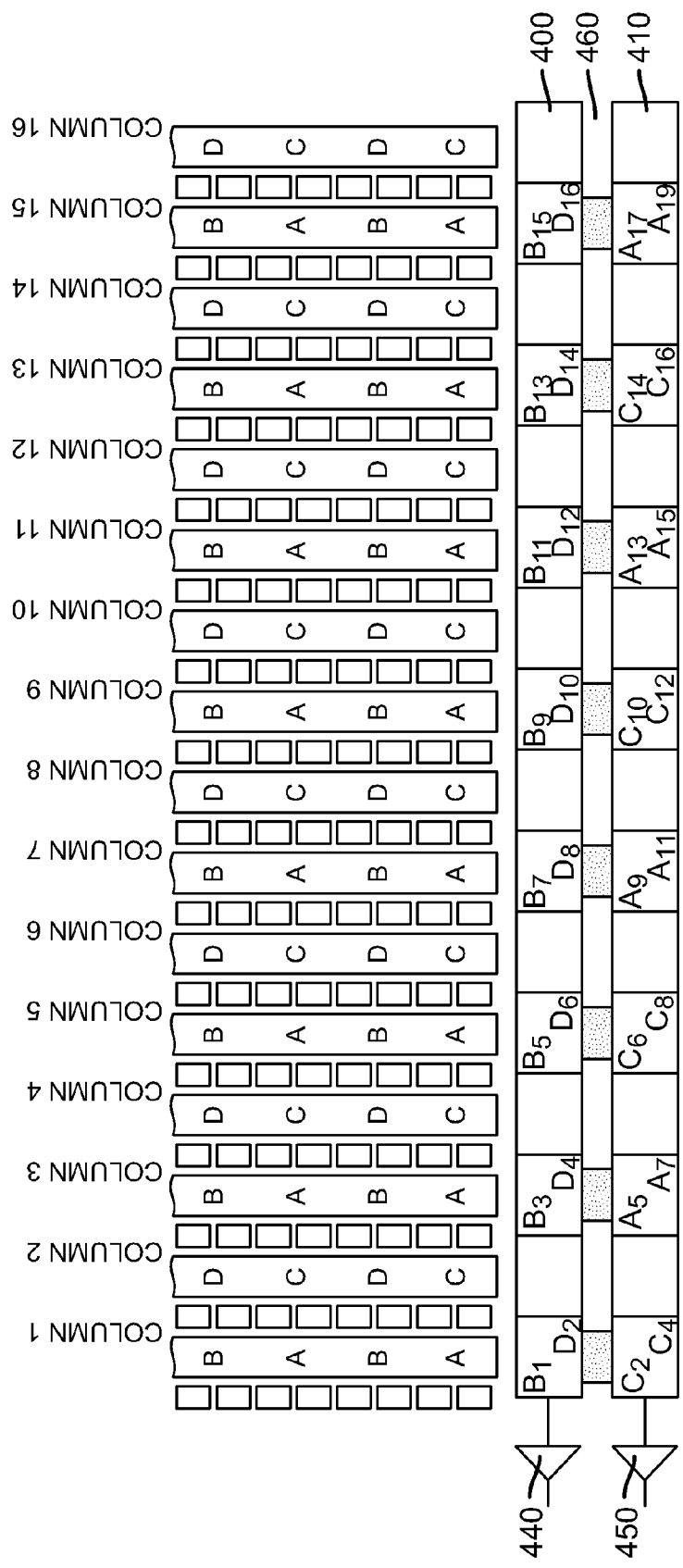
FIG. 32 is the location of charge packets at time step T3 of FIG. 32.

FIG. 28 shows an electronic camera 610 containing the image sensor 600 of the present invention capable of video and high-resolution still photography as described earlier. In video mode, 100 percent of all pixels are sampled.

The VCCD charge capacity is controlled by the amplitude of the VCCD gate clock voltages. Since the invention sums charges in the HCCD, the VCCD does not have to contain full charge packets in order to produce a full signal at the output amplifiers. If the HCCD will sum together two charge packets, then VCCD charge capacity can be reduced by a factor of two by lowering the amplitude of the VCCD clock voltages. The advantage of lowering the VCCD clock voltages is reduced power consumption in video mode. The power consumption varies as the voltage squared. Thus a camera would increase the VCCD clock voltages if the camera is operating in still photography mode, and decrease the VCCD clock voltages if the camera is operating in video mode.

Figure 33:
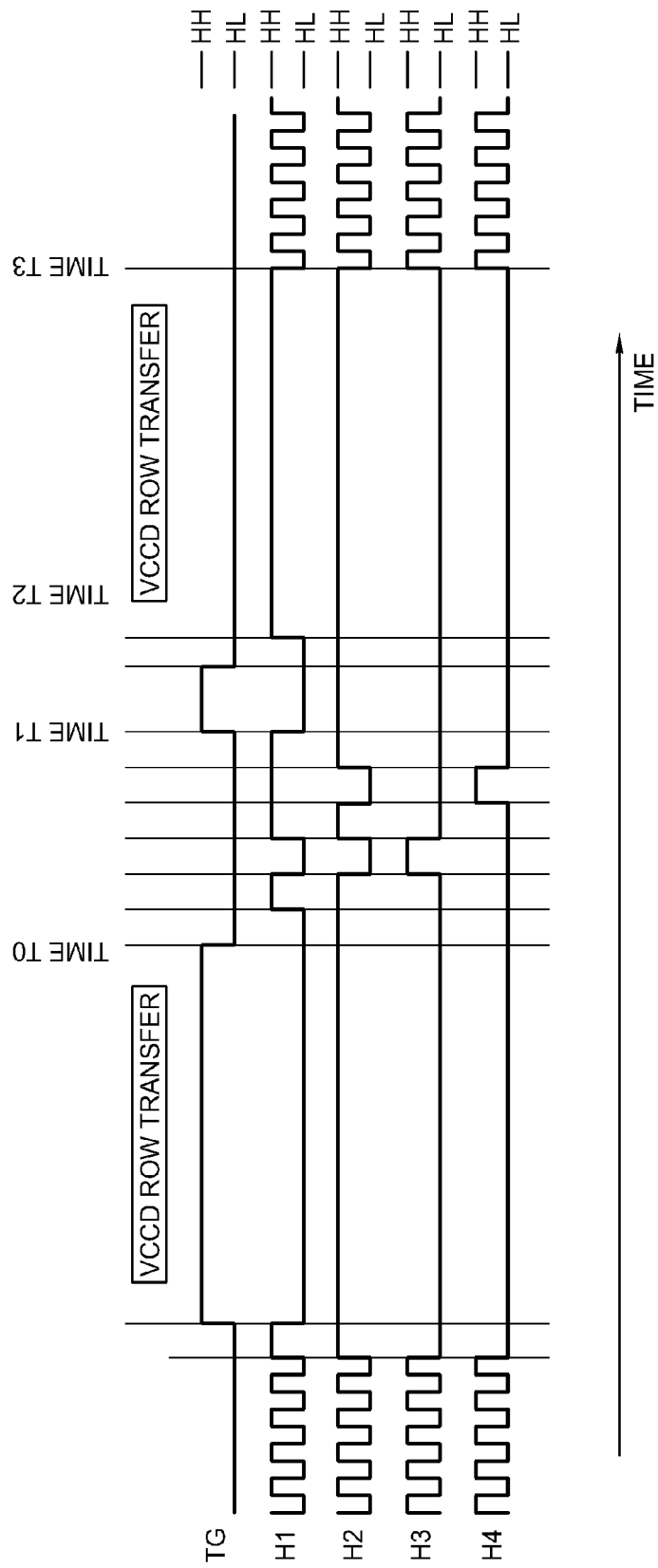
FIG. 33 is the timing diagram for the second embodiment of the invention.

There is also an alternate embodiment of the present invention. FIG. 26 shows that three HCCD clock voltages are required. In the alternate embodiment a HCCD clocking is presented that only requires two HCCD clock voltages. The HCCD design and gate layout is the same as FIG. 19. The flow of charge new clocking sequence is shown in FIGS. 29 through 33. The timing diagram for this sequence is shown in FIG. 33. Time T0 of FIG. 33 corresponds to FIG. 29. At this point of time in the clocking sequence one row of charge has been transferred from the VCCD into the dual HCCDs 400 and 410. There is one color for each HCCD. At the next time step T1 of FIG. 33 corresponds to FIG. 30. Now two adjacent charge packets of the same color have been summed together in each HCCD. To increase the frame rate of the image sensor it is necessary to fit two rows of charge from the VCCD into the dual HCCDs. To accomplish this the next time step T2 of FIG. 33 corresponding to FIG. 31 shifts the charge packets in HCCD 410 over two columns to position the empty charge packet beneath the charge packets of HCCD 400. Then the charge packets of HCCD 400 are transferred through the transfer gate 460 from HCCD 400 to the empty charge packets in HCCD 410. Now in FIG. 31 one entire line of charge from the VCCD is contained in HCCD 410. The next row of charge from the VCCD must fit entirely within HCCD 400. At time step T3 of FIG. 33 corresponding to FIG. 32 adjacent columns of two different colors have been summed together in HCCD 400.

Even though two different colors are summed together it is still possible to reconstruct a full color image. For example, suppose the color pattern is A=green, B=red, C=blue and D=green. This is the Bayer color filter pattern. HCCD 410 will contain separated colors blue and green. HCCD 400 will be the sum of colors red+green that forms yellow. Only the red component of the final red/green/blue color image is missing. A simple subtraction of yellow-green in the image processing will recover the red component.

Another equivalent permutation of the Bayer pattern where A=green, B=blue, C=red, and D=green results in HCCD 410 containing separated colors red and green. HCCD 400 contains summed colors blue+green that forms cyan. Only the blue component of the final red/green/blue color image is missing. A simple subtraction of cyan-green in the image processing will recover the blue component.

The second embodiment of the invention may be combined with any summing pattern operation in the VCCD. The VCCD summing operation used with the second embodiment may sum together 1 or more pixels not limited to just even or odd numbers of sums.

The invention has been described with reference to a preferred embodiment. However, it will be appreciated that variations and modifications can be effected by a person of ordinary skill in the art without departing from the scope of the invention.

PARTS LIST

10 Image Sensor (CCD)
20 Photodiode
30 Vertical CCD (VCCD)

40 Horizontal CCD (HCCD)
50 Output Amplifier
100 Image Sensor
120 Photodiode
130 Vertical CCD (VCCD)
131 Two Colors Per Column
132 Control Gate Electrode
134 Control Gate Electrode
380 Channel Potential Implant Adjustment
400 First HCCD
410 Second HCCD
420 Vertical CCD (VCCD)
430 Photodiode
440 Output Amplifier
450 Output Amplifier
460 Transfer Channel/Gate
520 n-type Buried Channel CCD
521 Output Amplifier
522 Reset Gate
523 Floating Diffusion
540 p-type Well or Substrate
600 Image Sensor
610 Electronic Camera

What is claimed is:

1. A method for summing charge packets generated in an image sensor that includes a plurality of vertical charge-coupled devices, a first horizontal charge-coupled device (HCCD), and a second horizontal charge-coupled device (HCCD) electrically connected to the first HCCD, the method comprising:

transferring a line of charge packets from the plurality of vertical charge-coupled devices to the first HCCD, wherein the charge packets represent two different colors;

transferring the charge packets representing only one color from the first HCCD to the second HCCD;

summing together two charge packets in the second HCCD by shifting every other charge packet three columns and the remaining charge packets one column within the second HCCD;

summing together two charge packets in the first HCCD by shifting every other charge packet two columns within the first HCCD;

shifting the summed charge packets in the second HCCD two columns so that the summed charge packets in the first HCCD are in the same column as the summed charge packets in the second HCCD;

summing together on a floating diffusion connected to the first HCCD two summed charged packets by reading out summed charge packets from the first HCCD; and summing together on a floating diffusion connected to the second HCCD two summed charged packets by reading out summed charge packets from the second HCCD.

* * * * *